(12) United States Patent
Martin et al.

(10) Patent No.: US 11,174,397 B2
(45) Date of Patent: Nov. 16, 2021

(54) COATINGS HAVING ADAPTABLE WETTABILITY AS WELL AS METHODS OF MAKING AND USING THEREOF

(71) Applicant: Ohio State Innovation Foundation, Columbus, OH (US)

(72) Inventors: Samuel Graeme Martin, Columbus, OH (US); Philip Simon Brown, Columbus, OH (US); Bharat Bhushan, Powell, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 135 days.

(21) Appl. No.: 16/346,719

(22) PCT Filed: Nov. 1, 2017

(86) PCT No.: PCT/US2017/059504
§ 371 (c)(1),
(2) Date: May 1, 2019

(87) PCT Pub. No.: WO2018/085376
PCT Pub. Date: May 11, 2018

(65) Prior Publication Data
US 2019/0300718 A1    Oct. 3, 2019

Related U.S. Application Data

(60) Provisional application No. 62/415,847, filed on Nov. 1, 2016.

(51) Int. Cl.
| | |
|---|---|
| *C09D 5/00* | (2006.01) |
| *C09D 7/40* | (2018.01) |
| *C09D 7/61* | (2018.01) |
| *C09D 7/45* | (2018.01) |
| *C09D 7/63* | (2018.01) |
| *C09D 183/04* | (2006.01) |
| *C09D 127/12* | (2006.01) |
| *C08J 7/04* | (2020.01) |
| *C09D 5/16* | (2006.01) |
| *C09D 7/20* | (2018.01) |

(52) U.S. Cl.
CPC ............ *C09D 5/1606* (2013.01); *C09D 5/00* (2013.01); *C09D 7/20* (2018.01); *C09D 7/45* (2018.01); *C09D 7/61* (2018.01); *C09D 7/63* (2018.01); *C09D 7/67* (2018.01); *C09D 127/12* (2013.01); *C09D 183/04* (2013.01); *C08J 2323/12* (2013.01); *C08J 2367/02* (2013.01); *C08J 2369/00* (2013.01); *C08J 2383/04* (2013.01); *C08J 2427/12* (2013.01); *C08J 2483/04* (2013.01)

(58) Field of Classification Search
None
See application file for complete search history.

(56) References Cited

U.S. PATENT DOCUMENTS

| | | | |
|---|---|---|---|
| 2004/0213904 A1 | 10/2004 | Muller et al. | |
| 2007/0166513 A1* | 7/2007 | Sheng | B05D 5/04 428/141 |
| 2013/0230695 A1 | 9/2013 | Sigmund et al. | |
| 2013/0251948 A1 | 9/2013 | Lyons et al. | |
| 2014/0011013 A1* | 1/2014 | Jin | H01L 31/02366 428/297.4 |
| 2014/0056834 A1* | 2/2014 | Kim | A61Q 19/02 424/62 |
| 2016/0075883 A1* | 3/2016 | Ebert | B05D 5/08 427/601 |

OTHER PUBLICATIONS

Jin et al., Preservation of superhydrophobic and superoleophobic properties upon wear damage, ACS Appl. Mater. Interfaces 2013, 5, 3, 485-488 (Year: 2013).*
Wang, Suhao, Mei Li, and Qinghua Lu. "Filter paper with selective absorption and separation of liquids that differ in surface tension." ACS Applied Materials & Interfaces 2.3 (2010): 677-683.
Bixler, Gregory D., and Bharat Bhushan. "Rice and butterfly wing effect inspired low drag and antifouling surfaces: a review." Critical Reviews in Solid State and Materials Sciences 40.1 (2015): 1-37.
Cao, Liangliang, et al. "Anti-icing superhydrophobic coatings." Langmuir 25.21 (2009): 12444-12448.
Hsieh, Chien-Te, et al. "Influence of surface roughness on water-and oil-repellent surfaces coated with nanoparticles." Applied Surface Science 240.1-4 (2005): 318-326.
Tuteja, Anish, et al. "Designing superoleophobic surfaces." Science 318.5856 (2007): 1618-1622.
Jung, Yong Chae, and Bharat Bhushan. "Wetting behavior of water and oil droplets in three-phase interfaces for hydrophobicity/philicity and oleophobicity/philicity." Langmuir 25.24 (2009): 14165-14173.
International Preliminary Report on Patentability issued for Application No. PCT/US2017/059504, dated May 16, 2019, 6 pages.
International Search Report and Written Opinion. International Searching Authority (US). Issued in PCT Application No. PCT/US2017/059504 dated Apr. 23, 2018. 9 pages.
Martin, Samuel, and Bharat Bhushan. "Transparent, wear-resistant, superhydrophobic and superoleophobic poly(dimethylsiloxane)(PDMS) surfaces." Journal of colloid and interface science 488 (2017): 118-126.

(Continued)

*Primary Examiner* — Cheng Yuan Huang
(74) *Attorney, Agent, or Firm* — Meunier Carlin & Curfman LLC

(57) ABSTRACT

Provided herein are articles including repellent coatings, as well as methods of making as using these articles. The articles can comprise a substrate and a repellent coating disposed on a surface of the substrate. The repellant coating can comprise hydrophobic particles dispersed within a polymer binder. The hydrophobic particles can be aggregated within the polymer binder, thereby forming a multiplicity of re-entrant structures embedded within and protruding from the polymer binder. The repellent coatings, and by extension the articles described herein, can exhibit selective wetting properties (e.g., superhydrophilicty/super-oleophobicity, or super-hydrophobicity/superoleophilicity).

20 Claims, 11 Drawing Sheets

(56) References Cited

OTHER PUBLICATIONS

Barthlott, Wilhelm, and Christoph Neinhuis. "Purity of the sacred lotus or escape from contamination in biological surfaces." Planta 202.1 (1997): 1-8.
Grosu, G., et al. "Relation between the size of fog droplets and their contact angles with CR39 surfaces." Journal of Physics D: Applied Physics37.23 (2004): 3350.
Feng, Lin, et al. "A super-hydrophobic and super-oleophilic coating mesh film for the separation of oil and water." Angewandte Chemie International Edition 43.15 (2004): 2012-2014.

* cited by examiner

Static contact angles

| Water | Hexadecane |

Nanoparticle/binder

CA 158±2°

CA Wet

Nanoparticle/binder and fluorosurfactant

CA Wet

CA 156±2°

Nanoparticle/binder and fluorosilane

CA 158±2°

CA 156±2°

Top- and tilt-view SEM images showing re-entrant geometries
Nanoparticle/binder

Top View

Tilt View

Wear experiment using ball-on-flat tribometer

Nanoparticle/binder and fluorosilane

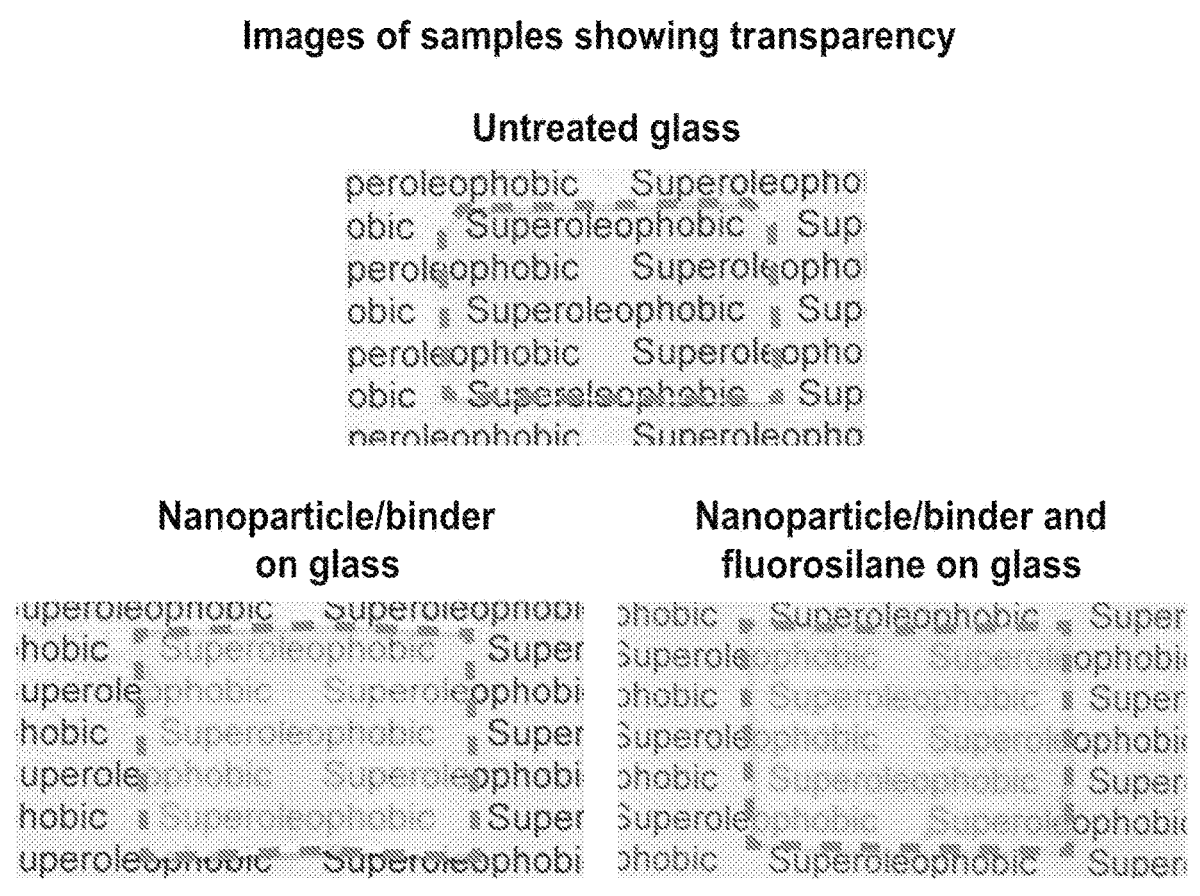

Images of samples showing transparency

Untreated glass

Nanoparticle/binder on glass

Nanoparticle/binder and fluorosilane on glass

Figure 8

Oil-water separation

Superhydrophobic/superoleophilic method using nanoparticle/binder

Superhydrophilic/superoleophobic method using nanoparticle/binder and fluorosurfactant

Mesh placed horizontally

Mesh placed at an incline

Optical images before and after self-cleaning

Before After

Untreated glass

Nanoparticle/binder

COATINGS HAVING ADAPTABLE WETTABILITY AS WELL AS METHODS OF MAKING AND USING THEREOF

CROSS-REFERENCE TO RELATED APPLICATIONS

This application is a national stage application filed under 35 U.S.C. § 371 of PCT/US2017/059504 filed Nov. 1, 2017, which claims the benefit of priority to U.S. Provisional Application 62/415,847, filed Nov. 1, 2016, which is incorporated by reference herein in its entirety.

BACKGROUND OF THE DISCLOSURE

The surface properties of a coating, with regards to wetting by liquids, are determined by the chemistry and topography at the interface. By selecting the correct chemistry and topography, a coating can display a variety of liquid wetting properties. These properties can be exploited for a variety of applications. For instance, coatings that repel water (hydrophobic) are useful for self-cleaning applications. In nature, this is most evident in the lotus leaf (Barthlott, et al., 1997, *Planta*, 202, 1-8); the superhydrophobic properties of the leaf surface, achieved through the presence of hierarchical structure created by rough papillae and superimposed with hydrophobic wax nanotubules, cause water droplets to roll around the surface of the leaf, collecting contaminants as they go thus keeping the leaf clean (Barthlott, et al.). Coatings that attract water (hydrophilic) are useful for anti-fogging applications (Grosu, et al., 2004, *J. Phys. D*, 37, 3350-3355). Coatings with surface tensions lower than that of water (72 mN m$^{-1}$) but higher than that of oils (20-30 mN m$^{-1}$) can attract oils (oleophilic) but repel water and can be used to create oil-water separators (Feng, et al., 2004, *Angew. Chem., Int. Ed.*, 43, 2012-2014; Wang, et al., 2010, *ACS Appl. Mater. Interfaces*, 2, 677-683). In addition, their water repellency also makes them ideal for self-cleaning (Bhushan, B., 2012, *Biomimetics: Bioinspired Hierarchical-Structured Surfaces for Green Science and Technology*, Springer-Verlag, Heidelberg, Germany; Bixler, et al., 2015, *Crit. Rev. Solid State Mat. Sci.*, 40, 1-37) and anti-icing (Cao, et al., 2009, *Langmuir*, 25, 12444-12448) applications. Coatings with lower surface tensions (~20 mN m$^{-1}$ or less) will repel both oil (oleophobic) and water and are useful for anti-fouling such as in medical and transport applications, where both the oil-repellency and nanostructuring are of importance (Hsieh, et al., 2005, *Appl. Surf Sci.*, 240, 318-326; Tuteja, et al., 2007, *Science*, 318, 1618-1622; Jung, et al., 2009, *Langmuir*, 25, 14165-14173).

There remains a need in the art for coatings having improved properties, including desirable surface properties combined with durability, as well as improved methods of making such coatings

SUMMARY OF THE DISCLOSURE

Provided herein are articles including repellent coatings, as well as methods of making as using these articles. The articles can comprise a substrate and a repellent coating disposed on a surface of the substrate. The repellant coating can comprise hydrophobic particles dispersed within a polymer binder. The hydrophobic particles can be aggregated within the polymer binder, thereby forming a multiplicity of re-entrant structures embedded within and protruding from the polymer binder. The repellent coatings, and by extension the articles described herein, can exhibit selective wetting properties (e.g., superhydrophilicty/superoleophobicity, or superhydrophobicity/superoleophilicity).

The substrate can be any suitable substrate. For example, the substrate can comprise a polymer substrate, such as polydimethylsiloxane (PDMS), polyethylene terephthalate (PET), polycarbonate (PC), polypropylene (PP), or a combination thereof; a glass substrate; a metal substrate, such as stainless steel; or a combination thereof. In certain embodiments, the substrate comprises a mesh or screen (e.g., a stainless steel mesh or screen).

The polymer binder can comprise any suitable binder polymer. In some embodiments, the polymer binder comprises an uncharged polymer. In certain embodiments, the polymer binder comprises a polysiloxane, such as a methylphenyl silicone resin.

The particles can be sized so as to form (e.g., by aggregation) a multiplicity of re-entrant structures embedded within and protruding from the polymer binder. In some embodiments, the particles can comprise nanoparticles. In certain embodiments, the particles can comprise nanoparticles having an average particle size of from 1 nm to 50 nm (e.g., from 5 nm to 25 nm), as measured by scanning electron microscopy (SEM). Examples of suitable nanoparticles include alkaline earth metal oxide nanoparticles, transition metal oxide nanoparticles, lanthanide metal oxide nanoparticles, group IVA oxide nanoparticles, transition metal nanoparticles, transition-metal catalyst nanoparticles, metal alloy nanoparticles, silicate nanoparticles, aluminosilicate nanoparticles, clays, and combinations thereof. In some cases, the particles can be functionalized (e.g., covalently modified with a hydrophobic silane) to increase their hydrophobicity. In certain embodiments, the particles can comprise silicon dioxide nanoparticles (e.g., silicon dioxide nanoparticles covalently modified with a hydrophobic silane).

The relative proportions of polymer binder and particles in the repellent coating can be selected to drive the formation of a multiplicity of re-entrant structures embedded within and protruding from the polymer binder (e.g., by aggregation of the particles). For example, in some embodiments, the particles and the polymer binder can be present in the repellent coating at a weight ratio of from 1:1 to 10:1 (e.g., from 2:1 to 8:1, or from 3:1 to 5:1).

In some embodiments, the repellent coating can further comprise a functional material disposed on the polymer binder, the multiplicity of re-entrant structures embedded within and protruding from the polymer binder, or a combination thereof. The functional material can be uniformly disposed on the polymer binder, the multiplicity of re-entrant structures embedded within and protruding from the polymer binder, or a combination thereof. Alternatively, the functional material can be patterned on the polymer binder, the multiplicity of re-entrant structures embedded within and protruding from the polymer binder, or a combination thereof. The functional material can have a thickness of 100 nm or less (e.g., a thickness of from 1 nm to 20 nm).

The functional material can comprise a superoleophilic material, a superoleophobic material, a superhydrophobic material, a superhydrophilic material, or a combination thereof. In some embodiments, the functional material comprises a low surface energy material. In certain cases, the functional material can comprise, for example, a fluorosurfactant, a halogenated silane (e.g., a fluorosilane), a fluoropolymer, or a combination thereof. In some embodiments, the functional material can be covalently attached to the polymer binder, the multiplicity of re-entrant structures embedded within and protruding from the polymer binder, or a combination thereof.

The thickness of the repellent coating can be varied depending on the desired properties of the repellent coating and/or applications for the article. In some embodiments, the repellent coating can have a thickness of from 50 nm to 2 microns (e.g., from 100 nm to 800 nm, or from 400 nm to 800 nm).

The wetting properties of the repellent coating can be varied, for example, through incorporation of a suitable functional material within in the repellent coating. In some embodiments, the repellent coating exhibits a water contact angle of at least 150° and a hexadecane contact angle of at least 150°. In some embodiments, the repellent coating exhibits a water contact angle of less than 10° and a hexadecane contact angle of at least 150°. In some embodiments, the repellent coating exhibits a water contact angle of at least 150° and a hexadecane contact angle of less than 10°. In some embodiments, the repellent coating can exhibit a hexadecane tilt angle of 10° or less (e.g., a hexadecane tilt angle of from 2° to 10°). In some embodiments, the repellent coating can exhibit a water tilt angle of 10° or less (e.g., a water tilt angle of from 2° to 10°).

Also provided are methods of forming repellent coatings on a substrate. Methods of forming repellent coatings on a substrate can comprise preparing coating dispersion comprising hydrophobic particles dispersed within a polymer binder and depositing the coating dispersion on a surface of the substrate to form the repellent coating, wherein when deposited the hydrophobic particles aggregate to form a multiplicity of re-entrant structures embedded within and protruding from the polymer binder.

The coating dispersion can be deposited on the substrate using any suitable method, such as film casting, spin coating, dip coating, spray coating, flow coating, vapor deposition, knife casting, film casting, vacuum-assisted dip-deposition, plasma deposition, or a combination thereof. In certain embodiments, depositing the coating dispersion can comprise spray coating the coating dispersion.

The relative proportions of polymer binder and particles in the coating dispersion can be selected to drive the formation of a multiplicity of re-entrant structures embedded within and protruding from the polymer binder (e.g., by aggregation of the particles). In some embodiments, the coating dispersion can comprise from 5 mg/mL to 30 mg/mL particles (from 15 mg/mL to 25 mg/mL particles). In some embodiments, the coating dispersion can comprise from 0.5 mg/mL to 15 mg/mL polymer binder (e.g., from 1 mg/mL to 10 mg/mL particles). In some embodiments, the particles and the polymer binder can be present in the coating dispersion in a weight ratio of from 1:1 to 10:1 (e.g., from 2:1 to 8:1, or from 3:1 to 5:1).

In some embodiments, methods of forming repellent coatings on a substrate can further comprise activating the repellent coating and depositing a functional material on the activated repellent coating. Activating the repellent coating can comprise, for example, ultraviolet (UV) treatment of the repellent coating, ultraviolet-ozone (UVO) treatment of the repellent coating, plasma treatment of the repellent coating, or a combination thereof. The functional material can be deposited on the activated repellent coating using any suitable method, such as film casting, spin coating, dip coating, spray coating, flow coating, vapor deposition, knife casting, film casting, vacuum-assisted dip-deposition, plasma deposition, or a combination thereof.

The articles described herein can exhibit tunable liquid repellency, making them useful in a wide range of applications including in oil-water separation. Accordingly, provided herein are methods of separating a liquid mixture comprising a polar liquid and a non-polar liquid. These methods can comprise contacting an article described herein (e.g., a mesh or screen comprising a suitable repellent coating) with the liquid mixture under conditions effective to afford permeation of either the polar liquid or the non-polar liquid through the article. For example, in some embodiments, the repellent coating can exhibit a water contact angle of less than 10° and a hexadecane contact angle of at least 150°, and the method can comprise contacting the article with the liquid mixture under conditions effective to afford permeation of the polar liquid through the article. In other embodiments, the repellent coating can exhibit a water contact angle of at least 150° and a hexadecane contact angle of at less than 10°, and the method can comprise contacting the article with the liquid mixture under conditions effective to afford permeation of the non-polar liquid through the article.

BRIEF DESCRIPTION OF THE DRAWINGS

As shown in FIG. 3, these coatings are highly adaptable and flexible, and can be tuned to achieve different wetting and repellency states.

FIG. 8 includes photographs showing transparency for untreated glass, nanoparticle/binder on glass, and nanoparticle/binder and fluorosilane on glass samples. The reduction in transparency in the coated samples is due to the $SiO_2$ nanoparticles and binder. Edges of each sample are shown in dashed lines.

DETAILED DESCRIPTION

Figure 1:
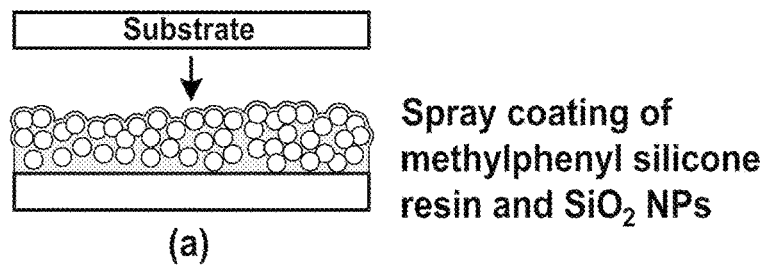
FIG. 1 is a schematic diagram illustrating the formation of surfaces having adaptable repellency using nanoparticles and binder. (a) illustrates the formation of superhydrophobic and superoleophilic coatings formed by depositing binder and nanoparticles to form a multiplicity of re-entrant structures protruding from the coating surface. (b) illustrates the formation of superhydrophilic and superoleophobic coatings by ultraviolet-ozone treatment and addition of a fluorosurfactant to (a). (c) illustrates the formation of superhydrophobic and superoleophobic coatings by ultraviolet-ozone treatment and addition of a fluorosilane to (a).
Figure 1:
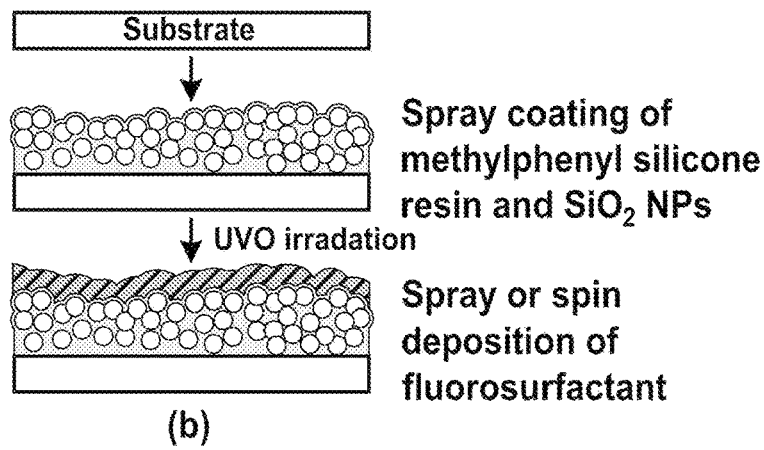
Figure 1:
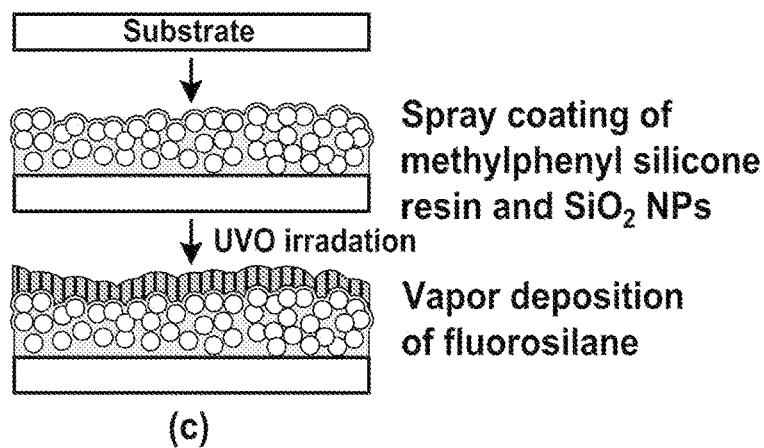

Provided herein are articles including repellent coatings, as well as methods of making as using these articles. The articles can comprise a substrate and a repellent coating disposed on a surface of the substrate. The repellant coating can comprise hydrophobic particles dispersed within a polymer binder. The hydrophobic particles can be aggregated within the polymer binder, thereby forming a multiplicity of re-entrant structures embedded within and protruding from the polymer binder. The repellent coatings, and by extension the articles described herein, can exhibit selective wetting properties (e.g., superhydrophilicty/superoleophobicity, or superhydrophobicity/superoleophilicity).

The substrate can be formed from any material known in the art, such as plastics, glass, fiberglass, ceramic, metals, fused silica, and woven or non-woven fabrics. The substrate can be in any configuration configured to facilitate formation of a coating suitable for use in a particular application. For example, the substrate can be flat, have a cylindrical cross-section, or oval cross-section. In certain embodiments, the substrate can be a liquid-permeable material, such as a mesh, screen, or porous solid. Examples of suitable substrates include polymer substrates, such as polydimethylsiloxane (PDMS), polyethylene terephthalate (PET), polycarbonate (PC), polypropylene (PP), or combinations thereof; glass substrates; metal substrates, such as stainless steel; or a combination thereof. In certain embodiments, the substrate can comprise a mesh or screen (e.g., a stainless steel mesh or screen, or a plastic mesh or screen).

The polymer binder can comprise any suitable binder polymer. Preferably, the polymer binder can be selected to provide mechanical durability and strong adhesion between the particles and substrate. The polymer binder can be a natural or synthetic polymer. The polymer binder can be a homopolymer or a copolymer comprising two or more monomers. The copolymer can be random, block, or comprise a combination of random and block sequences. The polymer binder can in some embodiments be a linear polymer, a branched polymer, or a hyperbranched/dendritic polymer. The polymer binder can also be a crosslinked polymer.

The polymer binder can comprise a hydrophobic polymer, a hydrophilic polymer, or a combination thereof. The polymer binder can comprise an anionic polymer, a cationic polymer, an uncharged polymer, or a combination thereof. In certain embodiments, the polymer binder comprises an uncharged polymer. In some embodiments, the polymer binder can comprise a thermoplastic polymer.

Examples of suitable polymer binders include, but are not limited to, polyolefins (e.g., polypropylene, polyethylene, polyisobutylene, polymethylpentene, polybutylene, ethylene propylene rubber, and ethylene propylene diene monomer rubber), polycarbonates, polyesters (e.g., polyglycolic acid, polylactic acid, polycaprolactone, polyhydroxyalkanoates, polyethylene terephthalate (PET), polybutylene terephthalate, polytrimethylene terephthalate, and polyethylene naphthalate), polyurethanes, polyamides (e.g., Nylon), polystyrene, polyacrylates, ABS (acrylonitrile butadiene styrene copolymers), vinyl polymers (e.g., polyvinyl chloride), polysiloxanes, copolymers thereof, and blends thereof. In certain embodiments, the polymer binder comprises a polysiloxane, such as a methylphenyl silicone resin.

The polymer binder can have a weight average molecular weight of 10,000 Da or greater. For example, the polymer binder can have a weight average molecular weight of 25,000 Da or greater, 50,000 Da or greater, 75,000 Da or greater, or 100,000 Da or greater. In some embodiments, the polymer binder can have a weight average molecular weight of from 25,000 Da to 1,000,000 Da (e.g., from 50,000 Da to 500,000 Da, from 50,000 Da to 250,000 Da, from 100,000 Da to 250,000 Da, or from 100,000 Da to 200,000 Da).

The polymer binder can have a number average molecular weight of 10,000 Da or greater. For example, the polymer binder can have a number average molecular weight of 25,000 Da or greater, 50,000 Da or greater, 75,000 Da or greater, or 100,000 Da or greater. In some embodiments, the polymer binder can have a number average molecular weight of from 25,000 Da to 1,000,000 Da (e.g., from 50,000 Da to 500,000 Da, from 50.000 Da to 250,000 Da, from 100,000 Da to 250,000 Da, or from 100,000 Da to 200,000 Da).

The repellent coating further comprises a plurality of particles. The size and shape of the plurality of particles can vary. The particles can be sized so as to form (e.g., by aggregation) a multiplicity of re-entrant structures embedded within and protruding from the polymer binder. In some embodiments, the particles can include spherical particles, non-spherical particles (such as elongated particles, cylindrical particles, rod-like particles, or any irregularly shaped particles), or combinations thereof. In certain embodiments, the particles can include nanostructures including nanoparticles, nanotubes, nanoclusters, nanowires, or combinations thereof.

In some embodiments, the particles can comprise nanoparticles (i.e., the particles can have an average particle size of less than 1 micron), as measured by SEM. In some embodiments, the plurality of particles can have an average particle size of less than 1 micron (e.g., less than 750 microns, less than 500 microns, less than 250 microns, less than 200 microns, less than 150 microns, less than 100 microns, less than 50 microns, less than 45 microns, less than 40 microns, less than 35 microns, less than 30 microns, less than 25 microns, less than 20 microns, less than 15 microns, less than 10 microns, or less than 5 microns), as measured by SEM. In some embodiments, the plurality of particles can have an average particle size of at least 1 nm (e.g., at least 5 nm, at least 10 nm, at least 15 nm, at least 20 nm, at least 25 nm, at least 30 nm, at least 35 nm, at least 40 nm, at least 45 nm, at least 50 nm, at least 100 nm, at least 150 nm, at least 200 nm, at least 250 nm, at least 500 nm, or at least 750 nm), as measured by SEM.

The particles can have an average particle size ranging from any of the minimum values described above to any of the maximum values described above. For example, in certain embodiments, the particles can have an average particle size of from 1 nm to 200 nm (e.g., from 1 nm to 150 nm, from 1 nm to 150 nm, from 1 nm to 100 nm, or from 1 nm to 50 nm), as measured by SEM. In certain embodiments, the particles can comprise nanoparticles having an average particle size of from 1 nm to 50 nm (e.g., from 5 nm to 25 nm, or from 5 nm to 15 nm), as measured by SEM.

The term "average particle size," as used herein, generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of an irregularly-shaped particle may refer to the largest linear distance between two points on the surface of the particle. As used herein, the diameter of the elongated particles, nanotubes, rod-like particles, or cylindrical particles may refer to the largest linear distance between two points on the horizontal cross-section of the particle. The mean particle size can be measured using methods known in the art, such as by dynamic light scattering or electron microscopy.

In the cases of non-spherical (e.g., rod-like particles), the particles can have an average particle length of 10 nm or greater. For example, the particles can have an average particle length of 50 nm or greater, 100 nm or greater, 200 nm or greater, 500 nm or greater, 1 µm or greater, 2 µm or greater, 3 µm or greater, 4 µm or greater, or 5 µm or greater. Non-spherical particles (e.g., rod-like particles) can also be described by their aspect ratio. In some embodiments, the particles can have an average aspect ratio of length to diameter of from 2:1 to 250:1.

In some cases, the particles can be monodisperse in size. The term "monodisperse," as used herein, describes a population of particles where all of the particles are the same or nearly the same size. As used herein, a monodisperse particle size distribution refers to particle distributions in which 80% of the distribution (e.g., 85% of the distribution, 90% of the distribution, or 95% of the distribution) lies within 20% of the median particle size (e.g., within 15% of the median particle size, within 10% of the median particle size, or within 5% of the median particle size). In other examples, particles in the repellent coating can be of varying sizes (e.g., a mixture of two or more populations of particles having different average particle sizes).

Examples of suitable nanoparticles include alkaline earth metal oxide nanoparticles, transition metal oxide nanoparticles, lanthanide metal oxide nanoparticles, group IVA oxide nanoparticles, transition metal nanoparticles, transition-metal catalyst nanoparticles, metal alloy nanoparticles, silicate nanoparticles, alumino-silicate nanoparticles, clays, and combinations thereof. In some cases, the particles can be functionalized (e.g., covalently modified with a hydrophobic silane) to increase their hydrophobicity. In certain embodiments, the particles can comprise silicon dioxide nanoparticles (e.g., silicon dioxide nanoparticles covalently modified with a hydrophobic silane).

The relative proportions of polymer binder and particles in the repellent coating can be selected to drive the formation of a multiplicity of re-entrant structures embedded within and protruding from the polymer binder (e.g., by aggregation of the particles). For example, in some embodiments, the particles and the polymer binder can be present in the repellent coating at a weight ratio of at least 1:1 (e.g., at least 2:1, at least 3:1, at least 4:1, at least 5:1, at least 6:1, at least 7:1, at least 8:1, or at least 9:1). In some embodiments, the particles and the polymer binder can be present in the repellent coating at a weight ratio of 10:1 or less (e.g., 9:1 or less, 8:1 or less, 7:1 or less, 6:1 or less, 5:1 or less, 4:1 or less, 3:1 or less, or 2:1 or less).

The particles and the polymer binder can be present in the repellent coating at a weight ratio of from any of the minimum values described above to any of the maximum values described above. For example, in some embodiments, the particles and the polymer binder can be present in the repellent coating at a weight ratio of from 1:1 to 10:1 (e.g., from 2:1 to 8:1, or from 3:1 to 5:1).

In some embodiments, the repellent coating can further comprise a functional material disposed on the polymer binder, the multiplicity of re-entrant structures embedded within and protruding from the polymer binder, or a combination thereof. The functional material can modulate the surface chemistry (and by extension physical properties) of the repellent coating. Thus, by incorporating a functional material, various properties of the repellent coating, including the hydrophobicity and/or oleophobicity of the coating, can be tuned.

The functional material can include any suitable material based on the desired surface properties of the coating. In some embodiments, the functional material can comprise an oleophilic material, an oleophobic material, a hydrophobic material, a hydrophilic material, or combinations thereof. In certain embodiments, the functional layer can comprise a hydrophilic/oleophilic material, a hydrophobic/oleophilic material, a hydrophobic/oleophobic material, or a hydrophilic/oleophobic material.

The functional layer can be derived from any suitable material, including polymers and small molecules. In some cases, the functional material can comprise a low surface energy material, such as a fluorosilane, a fluorosurfactant, a fluoropolymer, or a combination thereof. In some embodiments, the functional material can include a silane. The silane can be halogenated or non-halogenated. In some embodiments, the silane can comprise an alkyl chain, a partially fluorinated alkyl chain, and/or an alkyl chain that has regions that are perfluorinated, any of which may be straight or branched. In some examples, the silane group can comprise one or more perfluorinated aliphatic moieties. In certain embodiments, the functional material can comprise a fluorosilane.

In some examples, the functional material can comprise a silane represented by a general Formula below $$CH_3(CH_2)_m SiR^1R^2R^3 \quad \text{I,}$$

$$CF_3(CF_2)_n(CH_2)_m SiR^1R^2R^3 \quad \text{II, or}$$

$$CHF_2(CF_2)_n(CH_2)_m SiR^1R^2R^3 \quad \text{III}$$

where n and m are integers (n is 0 or greater, and m is 0 or greater), and $R^1$, $R^2$, and $R^3$ are independently a halogen, alkyl, or alkoxy group.

In some embodiments, the functional material can comprise one or more silanes represented by Formulas I-III. In some examples, the functional material can comprise perfluoroalkyltrichlorosilane, perfluoroalkyl(alkyl)dichlorosilane, perfluoroalkyl(alkyl)dialkoxylsilanes, of perfluoroalkyltrialkoxysilanes. Specifically, the functional layer can comprise perfluorododecyltrichlorosilane, perfluorotetradecyltrichlorosilane, perfluorooctyltrichlorosilane, perfluorodecyltrimethoxysilane, perfluorododecyltrimethoxysilane, perfluorotetradecyltrimethoxtsilane, perfluorooctyltrimethoxysilane, perfluorodecyltriethoxysilane, perfluorododecyltrimethoxysilane, perfluorotetradecyltriethoxysilane, perfluorooctyltrimethoxysilane, and perfluorodecylmethyldichlorosilane.

In some embodiments, the functional material can include a fluorosurfactant. Suitable flourosurfactants can include anionic fluorosurfactants, cationic fluorosurfactants, amphoteric fluorosurfactants, non-ionic fluorosurfactants, and combinations thereof. Examples of suitable fluorosurfactants include those sold under the tradenames FLEXIPEL™, ZONYL®, CAPSTONE®, and MASURF®. Specific examples of suitable fluorosurfactants include FLEXIPEL™ AM-101 partially fluorinated polymer, ZONYL® 9361 anionic fluorosurfactant, CAPSTONE® FS-50 anionic fluorosurfactant, CAPSTONE® FS-63 anionic fluorosurfactant, and MASURF® FP-815CP anionic fluoroacrylate copolymer.

The functional material can be uniformly distributed across the adhesive layer. Alternatively, the functional material can be patterned. For example, the functional material can be present at some points on repellent coating and absent at others, such that the functional material is present at some points on the surface of the repellent coating while the polymer binder and/or multiplicity of re-entrant structures embedded within and protruding from the polymer binder without the functional material are present at other points on the surface of the repellent coating. In other cases, the functional layer can be patterned such that the composition of the functional material varies at different points on the repellent coating, such that a first functional material is present at some points on the surface of the repellent coating and a second functional material is present at some points on the surface of the repellent coating. When the functional material is patterned, the pattern of the functional material can be random or ordered.

In some embodiments, the functional material can have a thickness of 100 nanometers or less (e.g., 50 nanometers or less, 25 nanometers or less, 20 nanometers or less, 10 nanometers or less, or 5 nanometers or less). In some embodiments, the functional material can have a thickness of from 1 nanometer to 100 nanometers (e.g., from 1 to 80 nanometers, from 5 to 80 nanometers, from 1 to 50 nanometers, from 5 to 50 nanometers, from 1 to 20 nanometers, from 5 to 20 nanometers, from 1 to 10 nanometers, or from 5 to 10 nanometers).

The repellent coating can be uniformly distributed across the substrate surface. Alternatively, the repellent coating can be patterned on the substrate surface. For example, the repellent coating can be present at some points on the substrate surface and absent at others, such that the material forming the repellent coating is present at some points on the substrate surface and absent at other points on the substrate surface. In other cases, the repellent coating can be patterned such that the composition of the repellent coating varies at different points on the substrate surface, such that a first repellent coating is present at some points on the substrate surface and a second repellent coating is present at other points on the substrate surface. When the repellent coating is patterned, the pattern of the repellent coating can be random or ordered.

The thickness of the repellent coating can be varied depending on the desired properties of the repellent coating and/or applications for the article. In some cases, the repellent coatings disclosed herein can have a thickness of from 50 nanometers to 2 microns (e.g., from 400 nanometers to 2 microns, from 500 nanometers to 2 microns, from 500 nanometers to 1.5 micron, from 100 nanometers to 800 nanometers, or from 500 nanometers to 1 micron). In some cases, the repellent coatings disclosed herein can have a thickness of less than 1 micron (e.g., less than 750 nanometers). In some embodiments, the repellent coatings can have a thickness of from 100 nm to 800 nm, or from 400 nm to 800 nm.

The wetting properties of the repellent coating can be varied, for example, through incorporation of a suitable functional material within in the repellent coating. The repellent coating can exhibit a water contact angle of at least 150° (e.g., at least 155°, at least 160°, or at least 165°), a hexadecane contact angle of at least 150° (e.g., at least 155°, at least 160°, or at least 165°), or both a water contact angle of at least 150° (e.g., at least 155°, at least 160°, or at least 165°) and a hexadecane contact angle of at least 150° (e.g., at least 155°, at least 160°, or at least 165°). The repellent coating can exhibit a water contact angle of 10° or less (e.g., 9° or less, 8° or less, 7° or less, 6° or less, 5° or less, 4° or less, 3° or less, or 2° or less), or a hexadecane contact angle of 10° or less (e.g., 9° or less, 8° or less, 7° or less, 6° or less, 5° or less, 4° or less, 3° or less, or 2° or less).

The repellent coating can exhibit a water tilt angle of less than 10° (e.g., 9° or less, 8° or less, 7° or less, 6° or less, 5° or less, 4° or less, 3° or less, or 2° or less) a hexadecane tilt angle of less than 10° (e.g., 9° or less, 8° or less, 7° or less, 6° or less, 5° or less, 4° or less, 3° or less, or 2° or less), or a water tilt angle of less than 10° (e.g., 9° or less, 8° or less, 7° or less, 6° or less, 5° or less, 4° or less, 3' or less, or 2° or less) and a hexadecane tilt angle of less than 10° (e.g., 9° or less, 8° or less, 7° or less, 6° or less, 5° or less, 4° or less, 3° or less, or 2° or less).

In some embodiments, the repellent coating can exhibit a water contact angle of at least 150° (e.g., at least 155°, at least 160°, or at least 165°) and a water tilt angle of less than 10° (e.g., 9° or less, 8° or less, 7° or less, 6° or less, 5° or less, 4° or less, 3° or less, or 2° or less). In some embodiments, the repellent coating can exhibit a hexadecane contact angle of at least 150° (e.g., at least 155°, at least 160°, or at least 165°) and a hexadecane tilt angle of less than 10° (e.g., 9° or less, 8° or less, 7° or less, 6° or less, 5° or less, 4° or less, 3° or less, or 2° or less). In some embodiments, the repellent coating can exhibit a water contact angle of at least 150° (e.g., at least 155°, at least 160°, or at least 165°), a hexadecane contact angle of at least 150° (e.g., at least 155°, at least 160°, or at least 165°), a water tilt angle of less than 10° (e.g., 9° or less, 8° or less, 7° or less, 6° or less, 5° or less, 4° or less, 3° or less, or 2° or less), and a hexadecane tilt angle of less than 10° (e.g., 9° or less, 8° or less, 7° or less, 6° or less, 5° or less, 4° or less, 3° or less, or 2° or less).

In some embodiments, the repellent coating exhibits a water contact angle of at least 150° and a hexadecane contact angle of at least 150°. In some embodiments, the repellent coating exhibits a water contact angle of less than 10° and a hexadecane contact angle of at least 150°. In some embodiments, the repellent coating exhibits a water contact angle of at least 150° and a hexadecane contact angle of less than 10°. In some embodiments, the repellent coating can exhibit a hexadecane tilt angle of 10° or less (e.g., a hexadecane tilt angle of from 2° to 10°). In some embodiments, the repellent coating can exhibit a water tilt angle of 10° or less (e.g., a water tilt angle of from 2° to 10°).

The repellent coating can exhibit good scrub resistance (also referred to herein as "wear resistance"). In some embodiments, the repellent coating can exhibit scrub resistance of at least 50 cycles at 10 mN (e.g., at least 100 cycles, at least 150 cycles, at least 200 cycles, at least 300 cycles, at least 400 cycles, at least 500 cycles, at least 600 cycles, at least 700 cycles, at least 800 cycles, at least 900 cycles, at least 1,000 cycles, at least 1,100 cycles, at least 1,200 cycles, at least 1,300 cycles, at least 1,400 cycles, or at least 1,500 cycles) as measured in accordance with the methods described herein. In some embodiments, the repellent coating can exhibit scrub resistance of 2,000 cycles or less (e.g., 1,500 cycles or less, 1,200 cycles or less, 1,000 cycles or less, or 500 cycles or less) as measured in accordance with the methods described herein.

The repellent coating can exhibit a scrub resistance ranging from any of the minimum values described above to any of the maximum values described above. For example, the repellent coating can exhibit a scrub resistance of from 50 cycles to 2,000 cycles. The scrub resistance of the repellent coating can be measured using any suitable method described herein. Briefly, the repellent coating can be worn using a borosilicate ball with radius 15 μm mounted on a rectangular cantilever with a nominal spring constant. To analyze the change in morphology of the surface before and after the wear experiment, height scans of 100×100 μm$^2$ in area can be obtained using a Si, n-type ($Si_3N_4$) tip with an Al coating operating in tapping mode. Root mean square roughness (RMS) values before and after wear experiments can be obtained.

In certain embodiments, the repellent coatings (and by extension the articles described herein) can exhibit superhydrophobic/superoleophilic properties, superhydrophobic/superoleophobic properties, or superhydrophilic/superoleophobic properties. As such, these articles can exhibit various desirable properties, such as, for example, self-cleaning, anti-fouling, anti-smudge, and anti-icing properties. In some embodiments, the repellent coating can impart microbial resistance to an article, moisture resistance to an article (e.g., metallic surface or other surfaces including wooden or ceramic surface), anti-fouling properties to an article (e.g., a surfaces, filters, membranes, or actuator). In some cases, the article can be a packaging material, an anti-fingerprint surface, a self-cleaning and dirt-repellent surface, a miniaturized sensors or other devices, an implantable device (e.g., a biochip, biosensor, or other medical device), a floating device such as a swimsuit, in oil tankers to prevent oil leakage, a thermal insulator in clothing, cooking ware, a material with low permittivity, a selective membrane, an air filter, or an article used in liquid extraction from mixtures.

Specific examples of articles on which the repellent coatings described herein can be applied can include, windows; windshields on automobiles aircraft, and watercraft; freezer doors; condenser pipes; ship hulls; underwater vehicles; underwater projectiles; airplanes and wind turbine blades; indoor and outdoor mirrors; lenses, eyeglasses or other optical instruments; protective sports goggles; masks; helmet shields; glass slides of frozen food display containers; glass covers; buildings walls; building roofs; exterior tiles on buildings; building stone; painted steel plates; aluminum panels; window sashes; screen doors; gate doors; sun parlors; handrails; greenhouses; traffic signs; transparent soundproof walls; signboards; billboards; guardrails; road reflectors; decorative panels; solar cells; painted surfaces on automobiles watercraft, aircraft, and the like; painted surfaces on lamps; fixtures, and other articles; air handling systems and purifiers; kitchen and bathroom interior furnishings and appliances; ceramic tiles; air filtration units; store showcases; computer displays; air conditioner heat exchangers; high-voltage cables; exterior and interior members of buildings; window panes; dinnerware; walls in living spaces, bathrooms, kitchens, hospital rooms, factory spaces, office spaces, and the like; sanitary ware, such as basins, bathtubs, closet bowls, urinals, sinks, and the like; and electronic equipment, such as computer displays.

Also provided are methods of forming repellent coatings on a substrate. Methods of forming repellent coatings on a substrate can comprise preparing coating dispersion comprising hydrophobic particles dispersed within a polymer binder and depositing the coating dispersion on a surface of the substrate to form the repellent coating, wherein when deposited the hydrophobic particles aggregate to form a multiplicity of re-entrant structures embedded within and protruding from the polymer binder.

The coating dispersion can comprise particles and a polymer binder dispersed in a solvent. Non-limiting examples of suitable solvents include aliphatic solvents (e.g., pentane, hexanes, cyclohexane); aromatic and/or alkylated aromatic solvents such as benzene, toluene, xylene; hydrocarbon solvents; dichloromethane, chloroform, alcohols (e.g., methanol, ethanol, isopropanol); esters (e.g., ethyl acetate); ketones (e.g., acetone); diethyl ether; dioxane; glycol ethers and glycol ether esters; tetrahydrofuran; dimethylformamide; acetonitrile; dimethyl sulfoxide; water, and combinations thereof.

The relative proportions of polymer binder and particles in the coating dispersion can be selected to drive the formation of a multiplicity of re-entrant structures embedded within and protruding from the polymer binder (e.g., by aggregation of the particles). In some embodiments, the coating dispersion can comprise from 5 mg/mL to 30 mg/mL particles (from 15 mg/mL to 25 mg/mL particles). In some embodiments, the coating dispersion can comprise from 0.5 mg/mL to 15 mg/mL polymer binder (e.g., from 1 mg/mL to 10 mg/mL particles). In some embodiments, the particles and the polymer binder can be present in the coating dispersion in a weight ratio of from 1:1 to 10:1 (e.g., from 2:1 to 8:1, or from 3:1 to 5:1).

The coating dispersion can be deposited on the substrate surface using any suitable casting technique. Examples of suitable casting techniques can include spray coating, dip coating, spin coating, flow coating, knife casting, film casting, vacuum-assisted dip-deposition, plasma deposition, or chemical vapor deposition. Dip coating includes a process in which a dispersion is contacted with the polymer surface. Excess dispersion is permitted to drain from the substrate surface, and solvent in the dispersion is evaporated at ambient or elevated temperature. Knife casting include a process in which a knife is used to draw the dispersion across the substrate surface to form a thin film of the dispersion of uniform thickness after which solvent in the dispersion is evaporated, at ambient or elevated temperatures. In certain embodiments, the coating dispersion can be deposited on the substrate surface by spray coating.

In some embodiments, methods of forming repellent coatings on a substrate can further comprise activating the repellent coating and depositing a functional material on the activated repellent coating. Activating the repellent coating can comprise, for example, ultraviolet (UV) treatment of the repellent coating, ultraviolet-ozone (UVO) treatment of the repellent coating, plasma treatment of the repellent coating, or a combination thereof. The functional material can be deposited on the activated repellent coating using any suitable method, such as film casting, spin coating, dip coating, spray coating, flow coating, vapor deposition, knife casting, film casting, vacuum-assisted dip-deposition, plasma deposition, or a combination thereof.

As discussed above, the articles described herein can exhibit tunable liquid repellency, making them useful in a wide range of applications including in oil-water separation. Accordingly, provided herein are methods of separating fluid mixtures comprising a first liquid and a second liquid. For example, the articles can be used to separate a polar liquid from a non-polar liquid. "Polar" as used herein, refers to a fluid having molecules whose electric charges are not equally distributed and are therefore electronically charged. Polar fluids are immiscible or hardly miscible with non-polar or hydrophobic fluids. "Non-polar" as used herein refers to a hydrophobic fluid. Non-polar fluids are immiscible, or hardly miscible with polar fluids such as for example water. The dielectric constant of a non-polar fluid is usually lower than that of water. Examples of a hydrophobic liquids include aliphatic hydrocarbons such as octanol, dodecane, or hexadecane. In some examples, the coatings can be used to separate a mixture of water and a non-polar liquid, such as an aliphatic hydrocarbon.

Methods of using the articles can include contacting the article (e.g., on the side comprising the repellent coating) with the fluid mixture under conditions effective to afford permeation of the polar liquid or the non-polar liquid. In some embodiments, the method can include withdrawing from the reverse side of the article a permeate containing at least one liquid, wherein the liquid is selectively removed from the fluid mixture. The permeate can comprise at least one liquid in an increased concentration relative to the feed stream. The term "permeate" refers to a portion of the feed stream which is withdrawn at the reverse or second side of the article, exclusive of other fluids such as a sweep gas or liquid which may be present at the second side of the article.

In some embodiments, the article can be selective to the polar liquid versus the non-polar liquid. In some embodiments, the article can be selective to the non-polar liquid versus the polar liquid. In some embodiments, the article can be impermeable to both the polar liquid and the non-polar liquid. The article can be used to separate fluids at any suitable temperature, including temperatures of 100° C. or greater. For example, the article can be used at temperatures of from 100° C. to 180° C. In some embodiments, the coating can be used at temperatures less than 100° C.

In some embodiments, the repellent coating can exhibit a water contact angle of less than 10° and a hexadecane contact angle of at least 150°, and the method can comprise contacting the article with a liquid mixture comprising an aqueous phase (e.g., water) and an organic phase (e.g., an oil) under conditions effective to afford permeation of the aqueous phase through the article. In certain of these embodiments, the article can be, for example, a mesh or screen coated with the repellent coating.

In some embodiments, the repellent coating can exhibit a water contact angle of at least 150° and a hexadecane contact angle of less than 10°, and the method can comprise contacting the article with a liquid mixture comprising an aqueous phase (e.g., water) and an organic phase (e.g., an oil) under conditions effective to afford permeation of the organic phase through the article. In certain of these embodiments, the article can be, for example, a mesh or screen coated with the repellent coating.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts are parts by weight, temperature is in ° C. or is at ambient temperature, and pressure is at or near atmospheric.

Example 1: Formation of Surfaces Having Adaptable Repellency

Overview

Surfaces that exhibit self-cleaning, anti-smudge, antifouling, and low-adhesion properties are of interest in industrial applications including automotive, aerospace, electronics, plastic packaging, and biomedical devices. Additionally, surfaces with oil-water separation properties have applications in oil spills, oil refineries, and chemical plants. In many surfaces created to date, the lack of mechanical durability has been an issue. In this work, a transparent, wear-resistant coating technique that exhibits substrate independency is used for superhydrophilic/phobic and superoleophilic/phobic properties. A spray technique to create a hierarchical, re-entrant coating is employed using a solution comprising hydrophobic $SiO_2$ nanoparticles, methylphenyl silicone resin binder, and solvent. Further treatment of the coating using ultraviolet-ozone exposure and fluorosurfactant or fluorosilane modified the surface functionality. By adapting the coating surface, various applications including oil-water separation or repellency of water, oil, and surfactant-containing liquids can be obtained.

Background

Liquid-repellant surfaces are of interest and may include self-cleaning, anti-smudge, antifouling, and low-adhesion characteristics. These properties have applications in a large number of industries which include automotive, aerospace, electronics, plastic packaging, and biomedical devices. When the liquid-repellant surfaces are also transparent, additional applications include smart screens for electronic display, camera lenses, window glass, and solar panels. A range of materials are used in these applications. Surfaces with the ability to separate oil-water mixtures are of interest for oil spills, oil refineries, and chemical plants. Inspiration can be taken from nature in order to create liquid-repellent and low-adhesive surfaces. The lotus leaf (*Nelumbo nucifera*) exemplifies these characteristics through extreme water repellency. This superhydrophobicity originates from the hierarchical structure formed by the combination of papillose epidermal cells as the microstructure and 3-D epicuticular wax tubules covering these cells as the nanostructure.

By understanding the resourceful designs in nature, mimicking them, and improving upon them, materials can be prepared that are useful in a wide range of applications. Nature has a limited material toolbox; however, by incorporating synthetic materials and better manufacturing processes, materials with enhanced surface properties can be generated.

Wettability

In many cases, the applications of a surface depend on the wetting characteristics of a droplet on the surface. A droplet can be any liquid and is commonly denoted as hydro- for water or oleo- for oil. A suffix of -philic or -phobic is used when the droplet is attracted or repelled, respectively. Therefore, four states can be obtained: hydrophilic or oleophilic for wetting with a water or oil droplet and hydrophobic and oleophobic for repelling with a water or oil droplet, respectively. When the contact angle (CA) is less than 10° in a -philic state or greater than 150° in a -phobic state, the prefix super- is added.

The wetting of a droplet on a solid surface is dependent upon surface chemistry and surface roughness. On a flat surface with a low surface energy, the maximum achievable CA with a water droplet is ~120°. In order to change the CA, the wetting interaction can be enhanced through the addition of surface roughness. For self-cleaning, anti-smudge, anti-fouling, and low-adhesion, another property of interest is contact angle hysteresis (CAH), which is the difference between advancing and receding contact angles. CAH can be shown to be related to the energy dissipation of a droplet flowing along a surface. Low CAH results in a droplet rolling along a surface at a very low tilt angle (TA), which facilitates particle removal for self-cleaning.

On a rough surface, two wetting states have been observed: the Wenzel regime and the Cassie-Baxter regime. In the Wenzel state, liquid fully penetrates the roughness features, which creates complete wetting of the solid interface. In the Cassie-Baxter state, the liquid droplet sits on top of the roughness asperities with air pockets trapped in between, which creates a composite solid-air-liquid interface. The Cassie-Baxter state leads to higher CA with a given surface roughness and is preferred for liquid-repellent surfaces. The high liquid-air fractional contact area also leads to low CAH, which is important for droplets to easily roll off a surface at a low TA to facilitate self-cleaning.

While superhydrophobicity is common in nature, superoleophobicity is uncommon and more difficult to accomplish, as the surface tensions of oils are much lower than that of water. Fluorinated components help repel low surface tension liquids such as oils by reducing adhesion forces. Oil is non-polar and therefore only interacts with another molecule through a London dispersion force, which is a temporary attractive force due to a pair of induced dipoles. Polarizability depends on the mobility of electrons and therefore quantifies the ability of a molecule to form instantaneous dipoles. Fluorine is commonly chosen to create low surface energy materials due to its low polarizability. In addition, fluorine is highly electronegative, which measures the tendency of an atom to attract bonding electrons to itself. Fluorine only requires one more electron in its 2p electron shell to create a stable electron configuration. The low polarizability and high electronegativity of fluorine leads to weak London dispersion, cohesive, and adhesive forces. Consequently, fluorinated materials are good choices for creating materials with a low surface energy.

Fluorinated materials can be combined with re-entrant geometries for improved repellency. Re-entrant geometries are shapes that have overhang structures where the surface features become narrower at the base. Re-entrant curvatures can be inverse trapezoidal, spherical, etc. and lead to higher CA than non-re-entrant geometries. These geometries can be used to form surfaces that repel surfactant-containing liquids such as shampoos and laundry detergents due to their low surface tension components and active groups. Both liquids contain surfactants that act as detergents, wetting agents, and foaming agents. Surfactants are molecules that can lower the interfacial tension between phases. They typically comprise a hydrophilic head group and a long hydrophobic tail. Common anionic surfactants feature a sulfate head group with a sodium counter-ion. This mixing of ionic and amphoteric surfactants is common in formulations for these types of products. Anionic surfactants are typically the main surfactant for cleaning purposes, while the amphoteric surfactants are often included as a foaming agent. All surfactants have the potential to lower the surface tension of the liquid, as well as adsorb at the interface of any solid with which the liquid comes into contact. These components typically have surface tension values of 25-60 mN/m, depending on concentration. The surface tensions of surfactants are on the same order as oils. However, a surfactant has polar head groups that are highly active and adhere to surfaces stronger than oils. Creating surfaces repellent to surfactant-containing liquids is important for the consumer packaging industry. These liquids readily coat the inside of plastic bottles, leading to wasted product and issues with recyclability.

Re-Entrant Geometry

In the Cassie-Baxter state, air pockets are formed due to surface roughness and results in a higher CA than the complete wetting in the Wenzel state. The ability to achieve the Cassie-Baxter state relies on the fact that the CA of the liquid on the corresponding flat surface ($\theta_{flat}$) is ≥90°. The $\theta_{flat}$ CA is the angle formed by the surface and the tangent of the solid-liquid interface. The surface tension force is directed along the surface and acts in the direction opposite to the tangent of the solid-liquid interface.

Figure 12:
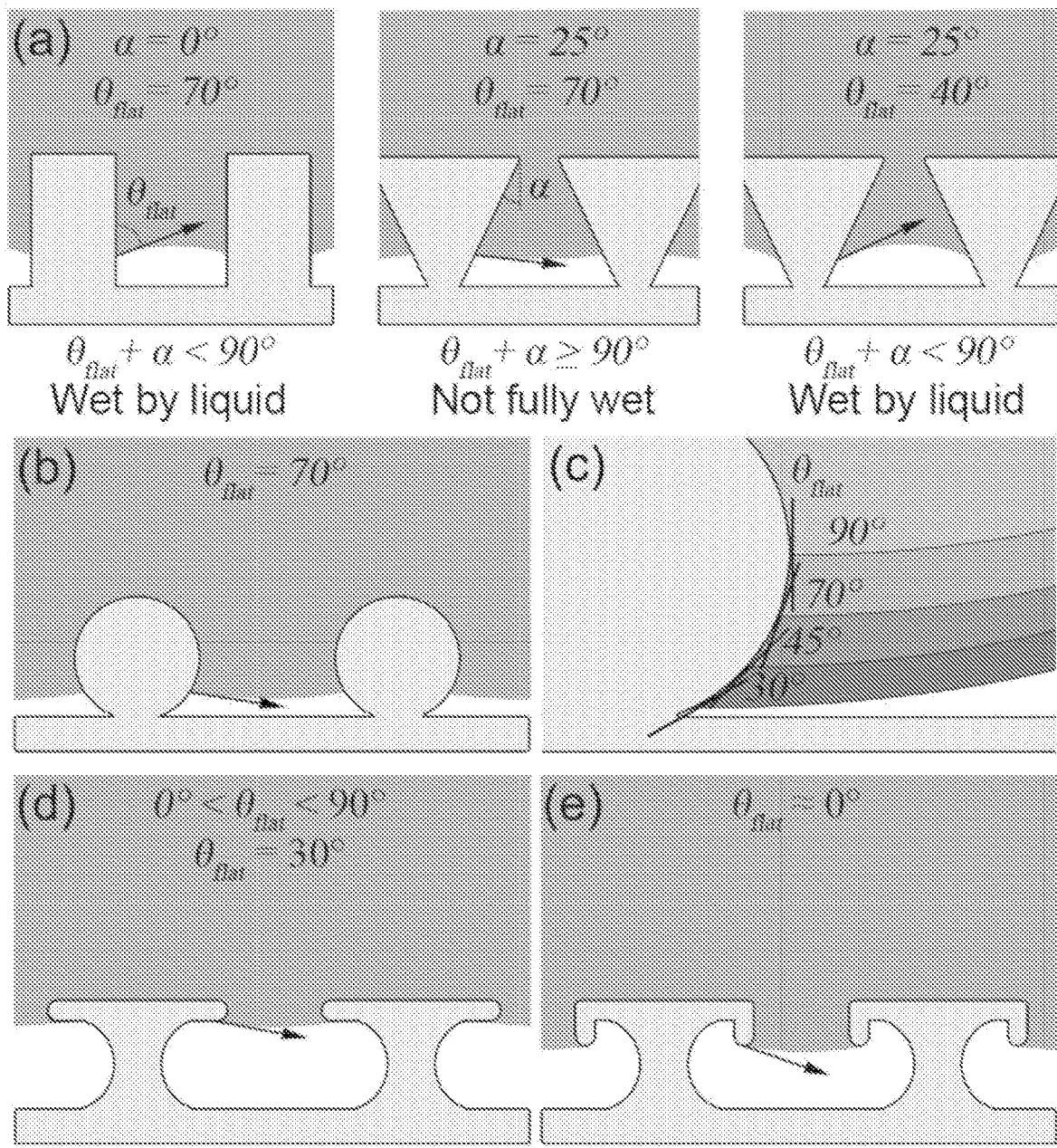
FIG. 12 illustrates a re-entrant surface geometry. Panel (a) illustrates $\theta_{flat}$ angles of <90° on non-re-entrant and re-entrant geometries. The liquid does not fully wet structure if $\theta_{flat}+\alpha \geq 90°$ thanks to favorable shape of the liquid-vapor interface. Panel (b) illustrates a geometry with re-entrant curvature supporting a $\theta_{flat}$ angle of 70°. Panel (c) illustrates a geometry with re-entrant curvature supporting various $\theta_{flat}$ angles of ≤90°. Panel (d) illustrates a re-entrant geometry supporting $\theta_{flat}$ angles of 30°. Panel (e) illustrates a doubly re-entrant geometry supporting $\theta_{flat}$ angles of ≈0°.

However, a high CA surface can be achieved, even if the CA of a liquid on the flat surface is small, by forming re-entrant structures on the surface. Re-entrant geometries are shapes that have overhang structures where the surface features become narrower at the base. Structures with re-entrant curvature (spherical, cylindrical, oval, etc.) are able to support high droplet CA for various liquids with flat CA <90° since it is possible to draw multiple tangents of a corresponding flat surface. Therefore, liquids with various flat CA can wet the re-entrant curvature to different extents to achieve a favorable liquid-vapor interface shape with the surface tension force directed upwards. See FIG. 12.

Summary

In this example, a solution comprising of hydrophobic $SiO_2$ nanoparticles, methylphenyl silicone resin binder, and a solvent was spray coated on substrates such as glass, polydimethylsiloxane (PDMS), polyethylene terephthalate (PET), polycarbonate (PC), polypropylene (PP), and stainless steel mesh. The resulting coating was superhydrophobic and superoleophilic. Subsequent surface activation using ultraviolet-ozone, followed by deposition of a functional material, such as a fluorosurfactant or fluorosilane, led to surfaces that exhibited superhydrophilic/superoleophobic or superhydrophobic/superoleophobic properties, respectively. The hierarchical, re-entrant coating was found to be wear-resistant with transparent properties and have oil-water separation and surfactant-containing liquid repellency characteristics. These coatings can also exhibit self-cleaning, anti-smudge, antifouling, and low-adhesion properties and can be used in applications where superhydrophilic/phobic and superoleophilic/phobic properties are needed.

Materials and Methods

First the fabrication methods for forming coatings will be described. Next, surface activation methods will be described. Finally, methods for characterizing coatings will be described.

Fabrication Methods

Figure 4:
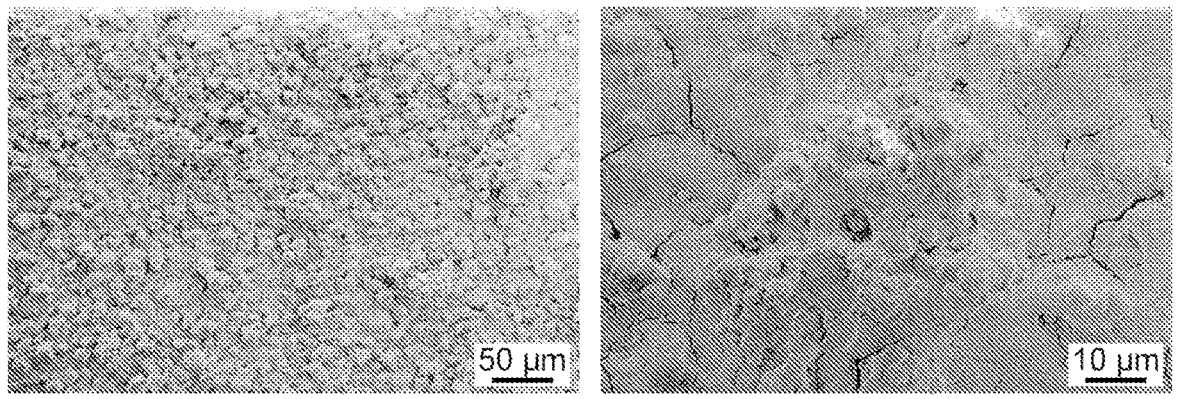
FIG. 4 includes SEM images of an example nanoparticle/binder coating. The top-down view shows agglomerates of nanoparticles and binder that form micron-sized structures. The tilt view shows these structures have quasi-spherical re-entrant geometries that were found to be repellent to hexadecane and water.
Figure 4:
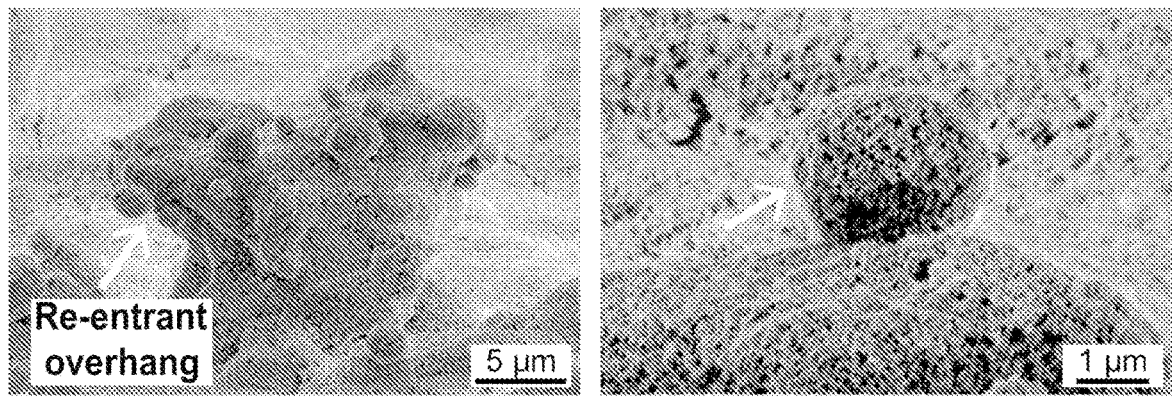

The coatings evaluated in this example are schematically illustrated in FIG. 1. The coatings are formed from hydrophobic $SiO_2$ nanoparticles and a methylphenyl silicone resin binder. As shown in FIG. 1(a), deposition of the binder and nanoparticles formed a multiplicity of re-entrant structures protruding from the coating surface. The resulting surface was later shown to be superhydrophobic and superoleophilic. As shown in FIG. 4(b), ultraviolet-ozone (UVO) activation of the surface shown in FIG. 1(a) followed by treatment with a fluorosurfactant afforded a surface that was later shown to be superhydrophilic and superoleophobic. As shown in FIG. 4(c), UVO activation of the surface shown in FIG. 1(a) followed by treatment with a fluorosilane afforded a surface that was later shown to be superhydrophobic and superoleophobic.

Methylphenyl silicone resin was selected because it is durable and offers strong adhesion between the nanoparticles and substrate. Hydrophobic, 10 nm $SiO_2$ nanoparticles were selected because they have high hardness for wear-resistance and high visible transmittance for transparency. However, other types of nanoparticles, including ZnO (zinc oxide) and ITO (indium tin oxide) particles of a similar diameter and surface treatment, could be used in place of the $SiO_2$ nanoparticles with similar results.

For the coating mixture, 600 mg of hydrophobic silica nanoparticles (10 nm diameter, Aerosil RX300) were dispersed in 30 mL of 40% tetrahydrofuran (THF, Fisher Scientific) and 60% IPA by volume. This mixture was sonicated using an ultrasonic homogenizer (20 kHz frequency at 35% amplitude, Branson Sonifer 450A) for 15 min. Then, 150 mg of methylphenyl silicone resin (SR355S, Momentive Performance Materials) was added. The mixture was then sonicated for an additional 15 min to form the final mixture.

For the coating fabrication procedure, various substrates can be used including glass, polydimethylsiloxane (PDMS), polyethylene terephthalate (PET), polycarbonate (PC), polypropylene (PP), and stainless steel mesh. In these examples, a typical substrate size for the glass and polymer samples was 25 by 10 mm. After choosing the substrate, 1 mL of the coating mixture was deposited via spray gun (Paasche®) from 10 cm away with compressed air at 210 kPa. The sample was transferred to an oven operating at 70° C. for 5 min to remove the remaining solvent. These steps create the coating shown in FIG. 1(a) and are the initial steps in the coatings shown in FIG. 1(b) and FIG. 1(c).

For the samples shown schematically in FIG. 1(b) and FIG. 1(c), the samples were irradiated using ultraviolet-ozone treatment with the samples placed 2 cm underneath the lamp source for 60 min. For the superhydrophilic and superoleophobic coating (FIG. 1(b)), 1 mL of a fluorosurfactant solution (Capstone FS-50, DuPont) diluted with ethanol to an overall fluorosurfactant concentration of 45 mg/mL was spin coated or spray coated onto the sample. For the superhydrophobic and superoleophobic coating (FIG. 1(c)), one drop of trichloro(1H,1H,2H,2H-perfluorooctyl)silane (448931, Sigma Aldrich) was vapor deposited on the sample using a closed container. The sample was attached to the top of the container via double-sided sticky tape with the surface facing down, and the drop was placed on the bottom of the container. This setup allowed the fluorosilane gas to uniformly coat the sample, and a vapor deposition time of 30 min was used.

Figure 2:
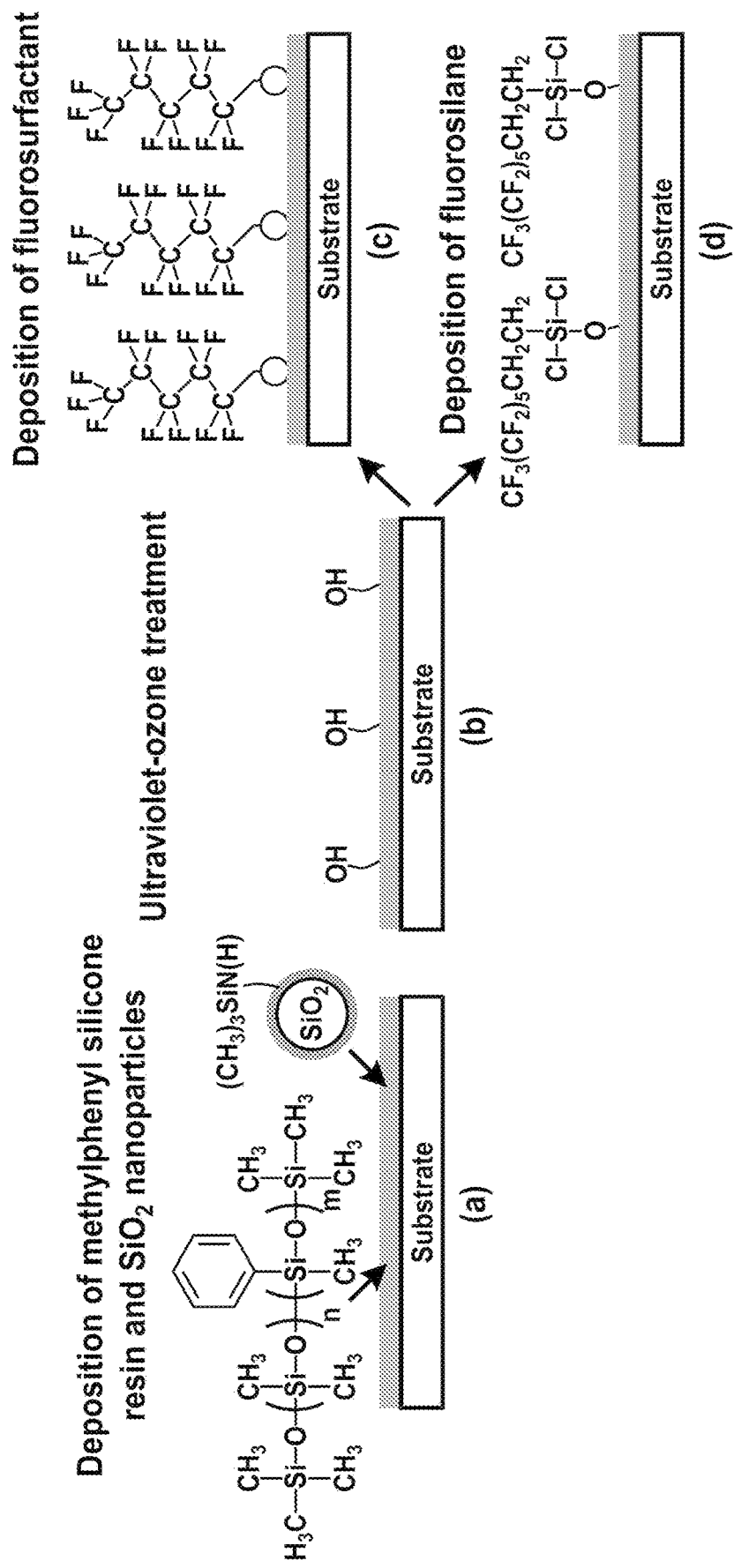
FIG. 2 illustrates the chemical composition for each step in the coating process described in FIG. 1. Step (a) illustrates the deposition of nanoparticles and binder for superhydrophobic and superoleophilic properties. Step (b) illustrates surface activation using ultraviolet-ozone treatment. Step (c) illustrates the deposition of fluorosurfactant where the hydrophilic head group of the fluorosurfactant is favorably attracted to the chemically activated surface resulting in the hydrophobic tail pointing away from the surface to form a surface that exhibits superhydrophilic and superoleophobic properties. Step (d) illustrates the deposition of fluorosilane which bonds to the —OH groups to form a surface that exhibits superhydrophobic and superoleophobic properties.

The chemical structure for each of these steps is shown in FIG. 2. The chemical composition of the methylphenyl silicone resin and hydrophobic $SiO_2$ nanoparticles is shown in FIG. 2(a). The surface activation step using UVO treatment is shown in FIG. 2(b). The deposition of a fluorosurfactant or fluorosilane is shown in FIG. 2(c) and FIG. 2(d), respectively.

Surface Activation

Surfaces can be chemically activated via plasma or ultraviolet (UV) treatment in order to modify the surface functionality. After activation, surfaces typically have a higher surface energy and improved adhesion for additional coatings. Plasma treatment is an effective surface treatment due to its aggressive nature. However, there are some disadvantages. It can be difficult to control and can require conditions not typically suitable for scale-up. Another possible option is UV treatment, which is a milder activation that can be applied in ambient environments and is more suitable for scale-up. Various polymer surfaces can activated using UV including PC, PP, PET, and PDMS.

UV treatment can be broken up into two forms: ultraviolet and ultraviolet-ozone (UVO) treatment). These two treatments can be used to activate surfaces in order to apply a coating with improved adhesion to the treated surface. Coating surfaces can be activated using UV and UVO in order to deposit coatings, including fluorosilane coatings. Here, both UV and UVO treatments were used to modify the surface functionality. UV exposure was generated using a compact germicidal lamp (15 W, Model CFL15/UV/MED, LSE Lighting) with the maximum energy output at the 254 nm wavelength. UVO exposure was generated using a U-shaped, ozone-producing, ultraviolent lamp (18.4 W, Model G18T5VH-U, Atlantic Ultraviolet Co.). It is expected that this lamp outputs a total of 5.8 W of 254 nm light, 0.4 W of 185 nm light, and 1.6 g/h of ozone in ambient conditions.

The UV method used irradiation at 254 nm, whereas the UVO method used a combination of 185 and 254 nm wavelengths. In the presence of 185 nm light, molecular oxygen can be dissociated into atomic oxygen, and atomic and molecular oxygen can be synthesized into ozone. In the presence of 254 nm light, ozone is decomposed into atomic and molecular oxygen.

In the UV process, 254 nm light breaks up organic bonds in the surface layer, which causes the surface to attempt to return to a stable condition. When these open bond sites react with oxygen, oxidation occurs and highly active, polar surface groups are formed. These groups are commonly hydroxyl, carbonyl, and carboxylic acids and lead to a chemically active, hydrophilic surface. In the UVO process, the combination of 185 and 254 nm light causes atomic oxygen to be continuously produced and ozone to be continuously synthesized and decomposed. The wavelengths of light excite and/or dissociate molecules at the surface and then react with atomic oxygen to form desorbing, volatile molecules, such as $CO_2$, $H_2O$, $N_2$, etc. The desorbing molecules create adsorption sites for oxygen to form highly active, polar surface groups, which lead to a chemically active, hydrophilic surface. The UVO process is an order of magnitude faster than the UV process due to an extra wavelength that produces highly-reactive atomic oxygen and helps excite and/or dissociate molecules.

Characterization of Samples

Characterization methods included contact and tilt angle measurements, scanning electron microscope imaging, coating thickness, repellency of surfactant-containing liquids, wear, anti-fogging, anti-icing, and oil-water separation.

Contact Angle and Tilt Angle

Contact and tilt angle data were measured using a standard automated goniometer (Model 290, Ramé-Hart Inc.) using 5 µL DI water and hexadecane (99%, Alfa Aesar) droplets deposited onto the samples using a microsyringe. Contact angle was measured by taking a static profile image of the liquid-air interface and was analyzed using DROPimage software. Tilt angle refers to the angle when the droplet just began to roll off the sample surface. All angles were averaged over at least five measurements on different areas of the sample and reported as +.

Scanning Electron Microscope (SEM) Imaging

Top down, scanning electron microscope (Philips/FEI Sirion) images were taken to determine the topography of the techniques. To image the re-entrant geometry, SEM images were taken at a 70-75° angle. Samples were mounted with conductive tape and gold-coated prior to imaging.

Coating Thickness

Coating thickness was measured using a step technique. One half of the substrate was covered with a glass slide using double-sided sticky tape before coating and then removed after the coating procedure resulting in a step. A scanning area of 100 by 100 µm² including the step was imaged using a D3000 Atomic Force Microscopy (AFM) with a Nanoscope IV controller (Bruker Instruments) to obtain the coating thickness. A Si, n-type ($Si_3N_4$) tip (resonant frequency $f$=66 kHz, spring constant k=3 N/m, AppNano) was used in contact mode.

Surfactant-Containing Liquid Repellency

To test the repellency of surfaces towards surfactant-containing liquids, droplets of shampoo (Head and Shoulders®, Procter and Gamble Co.) and/or laundry detergent (Tide®, Procter and Gamble Co.) were placed onto surfaces tilted at ~25°. The resulting surface-liquid interaction was photographed. The shampoo primarily contains sodium lauryl sulfate and sodium laureth sulfate surfactants, while the laundry detergent primarily contains sodium alcoholethoxy sulfate and sodium alkylbenzene sulfonate surfactants. At high concentrations, these surfactants typically have surface tensions on the order of 25 mN/m. In the products listed, depending upon concentration, the surface tensions will likely be in the range of 25-60 mN/m with values closer to the higher end.

Wear Experiment

The mechanical durability of the surface was examined using a macroscale wear test utilizing a ball-on-flat tribometer. A 3 mm diameter sapphire ball was fixed in a stationary holder. A load of 10 mN was applied normal to the surface, and the tribometer was put into a reciprocating motion for 100-200 cycles. Stroke length was 6 mm with an average linear speed of 1 mm/s. The surface was imaged before and after the experiment using an optical microscope with camera.

Contact pressure for the tribometer wear experiment was calculated based on Hertz analysis. An elastic modulus of 390 GPa and Poisson's ratio of 0.23 were used for the sapphire ball. For the nanoparticle/binder technique, an elastic modulus of 0.5 GPa and Poisson's ratio of 0.5 were used as an estimate for the composite coating, resulting in a mean contact pressure of 4.8 MPa. Due to the inclusion of $SiO_2$ nanoparticles, the elastic modulus of the final coating was expected to be higher, so an underestimated pressure will be obtained with the selected modulus.

Oil-Water Separation

The superhydrophobic/superoleophilic and superhydrophilic/superoleophobic coatings were evaluated for their ability to perform oil-water separations. Stainless steel meshes (#400) were first cleaned with acetone and 2-propanol (Fisher Scientific) until they were found to be hydrophilic, then the coatings were deposited onto the meshes via spray coating. The coated meshes were then placed on top of beakers. Agitated mixtures of hexadecane and water were then poured onto the coated meshes to evaluate whether the coated mesh was selectively permeable to water or hexadecane. To improve contrast, Oil Red O and Blue 1 were used as oil and water dispersible dyes respectively. The use of dyes was not found to have any effect on the performance of the coating.

Self-Cleaning

Self-cleaning characteristics were examined by contaminating the sample with silicon carbide and comparing the removal of particles by water droplets before and after the experiment. Silicon carbide (SiC, Sigma Aldrich) particles of size 10-15 µm were dispersed in a glass chamber (0.3 m diameter and 0.6 m high) by blowing 1 g of SiC powder for 10 s at 300 kPa. After dispersion, the particles were allowed to settle on the sample mounted on a 45° tilted stage for 30 min.

The contaminated sample was then secured to a 10° stage and water droplets (total volume of 5 mL) were dropped onto the surface from 1 cm in height. The removal of particles by the water droplets was compared before and after tests. The ability for the water droplets to remove particles was quantified using image analysis software (SPIP 5.1.11, Image Metrology A/S, Horshølm, Denmark).

Anti-Smudge Anti-smudge characteristics were examined by first contaminating the sample as described for self-cleaning. The contaminated samples were then secured on a stage and a hexadecane-impregnated micro-fiber wiping cloth was attached to a horizontal glass rode (diameter of 5 mm) fixed on a cantilever above the sample. As the cloth was brought in contact with the sample, the microfiber cloth was set to rub the contaminated sample under a load of 5 g for 1.5 cm at a speed of about 0.2 mm/s. Images were taken using an optical microscope with a CCD camera (Nikon, Optihot-2). The removal and transfer of particles by the cloth was compared before and after tests.

Results and Discussion

The adaptable methods for wettability and repellency are discussed for the spray coating of hydrophobic nanoparticles with a methylphenyl silicone resin binder. First, the nanoparticle/binder layer (average thickness ~4 µm) was deposited. For different surface functionality, a coating of fluorosurfactant or fluorosilane was deposited afterwards. The wettability, surface morphology, repellency of surfactant-containing liquids, mechanical durability, transparency, oil-water separation, self-cleaning, anti-smudge, and antifouling will now be reported.

Wettability

Figure 3:
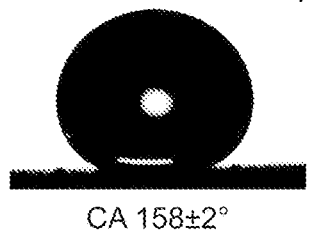
FIG. 3 illustrates contact angle images for droplets of water and hexadecane deposited on three different coatings.
Figure 3:
Figure 3:
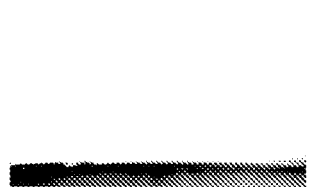
Figure 3:
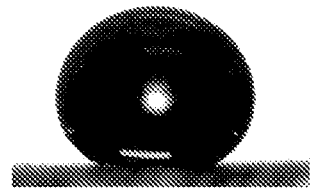
Figure 3:
Figure 3:
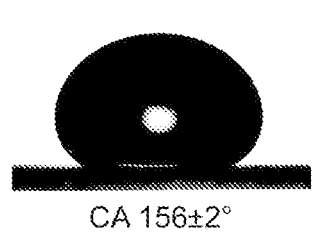

The static CA values for water and hexadecane on the various coatings are shown in FIG. 3 and Table 1. The TA for the surfaces are also shown in Table 1. The nanoparticle/binder method for superhydrophobicity and superoleophilicity resulted in water CA of 158° and wetting with hexadecane. The nanoparticle/binder and fluorosurfactant method for superhydrophilicity and superoleophobicity resulted in wetting with water and hexadecane CA of 156°. The nanoparticle/binder and fluorosilane method for superhydrophobicity and superoleophobicity resulted in water CA of 158° and hexadecane CA of 156°. For the -phobic samples, TA with water and hexadecane was less than 2°.

TABLE 1

Comparison of static contact angles and tilt angles for water and hexadecane droplets deposited on the coatings described herein.

| Coating | Contact angle (°)/Tilt angle (°) | |
|---|---|---|
| | DI water | Hexadecane |
| Nanoparticle/binder | 158 ± 2/≤1 | Wet/n/a |
| Nanoparticle/binder and fluorosurfactant | Wet/n/a | 156 ± 2/2 ± 1 |
| Nanoparticle/binder and fluorosilane | 158 ± 2/≤1 | 156 ± 2/2 ± 1 |

Surface Morphology

In order to understand the surface morphology of the nanoparticle/binder coating, SEM images of the coating were taken. See FIG. 4. The coatings were found to contain hierarchical structures showing re-entrant geometry. These re-entrant geometries helped support oil droplets for superoleophobicity. The micron-sized agglomerates of nanoparticles and binder are shown in a top-down view. This first level hierarchy exhibited structures of various size and shape. In order to view the re-entrant geometry of the structures, SEM images at a 700 from normal tilt angle were taken. These images show that the nanoparticles and binder combined into quasi-spherical shapes, which is one form of the re-entrant geometry. In addition, the nanoparticle and binder formed a rough outer surface of the micron-sized agglomerates, which is the second level of hierarchy. A rough surface would increase the number of air pockets and therefore increase the air-liquid contact area for increased liquid repellency. It is striking that re-entrant geometries were created using a simple and scalable fabrication technique.

It is believed that the re-entrant structures are formed due to nanoparticle agglomeration. The small diameter of a nanoparticle leads to a very high surface-to-volume ratio. Since surface energy is inversely proportional to particle diameter, surface energy is a significant contributor to nanoparticle properties. The large surface energy can promote nanoparticle agglomeration and the resin would help bind the structure together. In order to minimize the surface energy, these agglomerates form tightly packed and quasi-spherical shapes. When these agglomerates are spray deposited, the resin binding and van der Waals attractive forces are great enough to resist the agglomerates breaking down due to the pressure of the spray gun and the collision energy from impacting the surface. In addition, smaller particles form agglomerates with a rougher surface that are more likely to give the re-entrant structure. A larger particle is less likely to form agglomerates and more likely to become partially embedded in the binder leading to hemispheres or spherical caps.

Repellency of Surfactant-Containing Liquids

Figure 5:
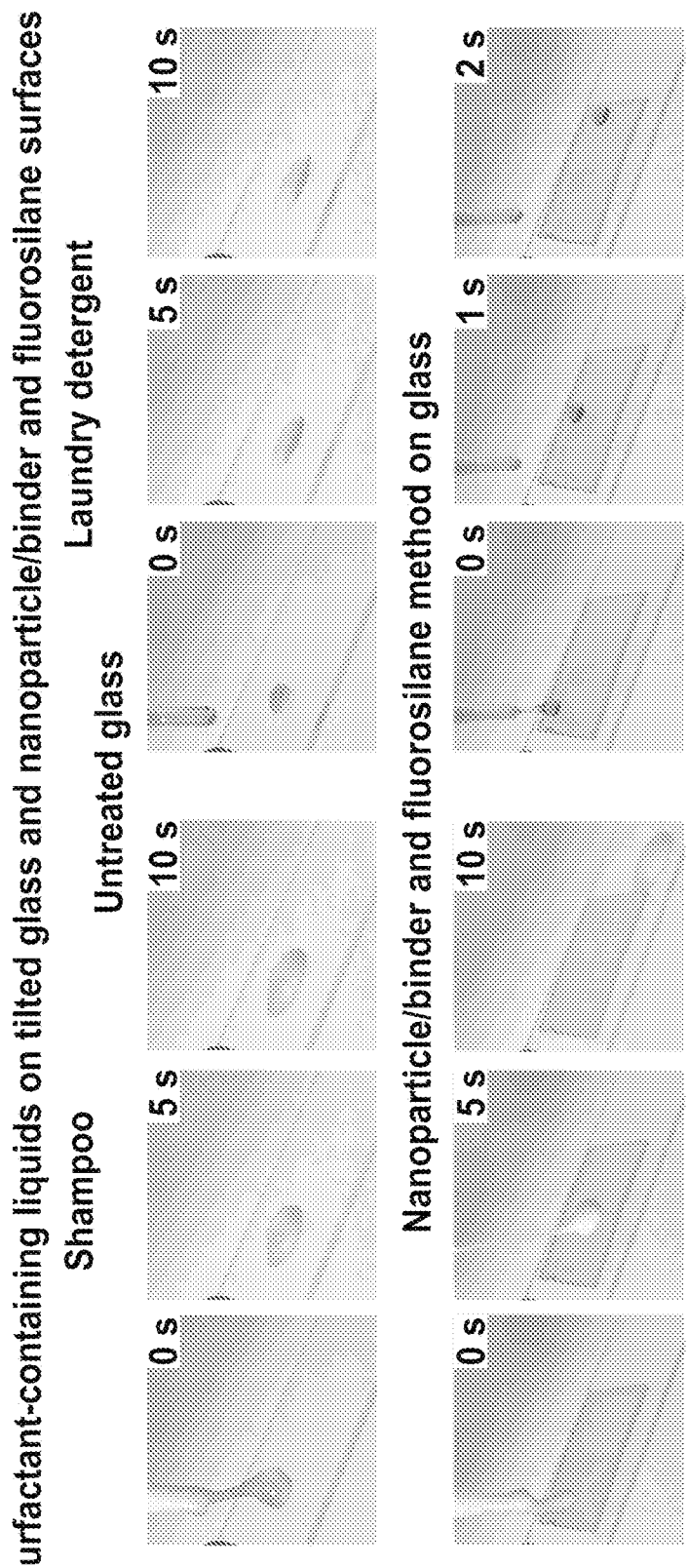
FIG. 5 includes photographs demonstrating repellency of surfactant-containing liquids by comparing shampoo and laundry detergent droplets deposited on untreated glass and nanoparticle/binder and fluorosilane surfaces.

A new challenge is creating surfaces that repel surfactant-containing liquids. Such surfaces can find use in many applications including consumer goods packaging, where repellency of surfactant-containing liquids is important in the packaging of shampoos and laundry detergents. Surfactant-containing liquids readily coat the inside of plastic bottles, leading to wasted product and issues with recyclability. To determine the applicability of the superhydrophobic/superoleophobic method in real world applications such as consumer packaging, its repellency against shampoo and laundry detergent was tested. Droplets of shampoo and laundry detergent were found to roll or slide from the surface with no noticeable contamination as shown in FIG. 5. This is in contrast to the untreated glass substrates where both shampoo and laundry detergent were found to spread and foul the surface.

Mechanical Durability

Figure 6:
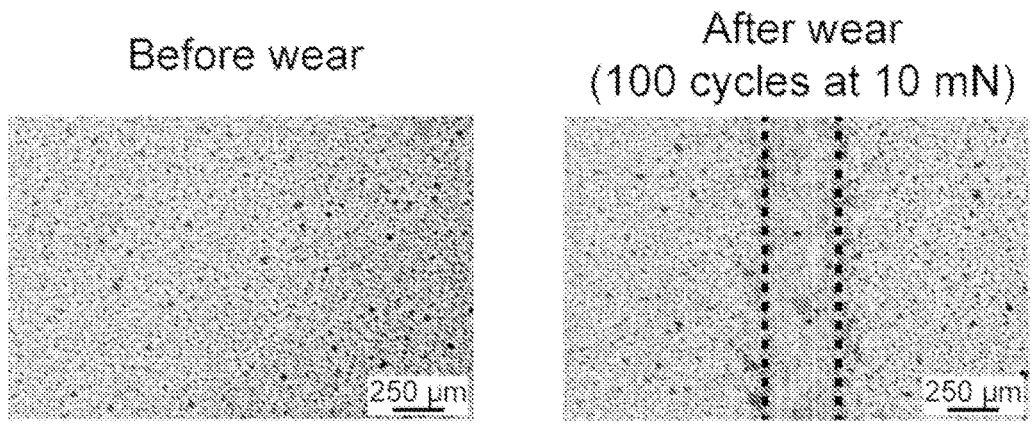
FIG. 6 shows optical micrographs before and after wear experiments using ball-on-flat tribometer using a 3-mm diameter sapphire ball at 10 mN and 45 mN loadings for nanoparticle/binder and fluorosilane surfaces.

The mechanical durability of the fluorinated nanoparticle/binder coating on flat PDMS was investigated using a tribometer wear experiment, and the resulting optical images, showing a portion of the wear track, are shown in FIG. 6. The wear test was carried out for 100 cycles at 10 mN and resulted in an observable wear scar. However, the coating was still able to repel hexadecane over the defect suggesting that the coating was not completely destroyed.

Figure 7:
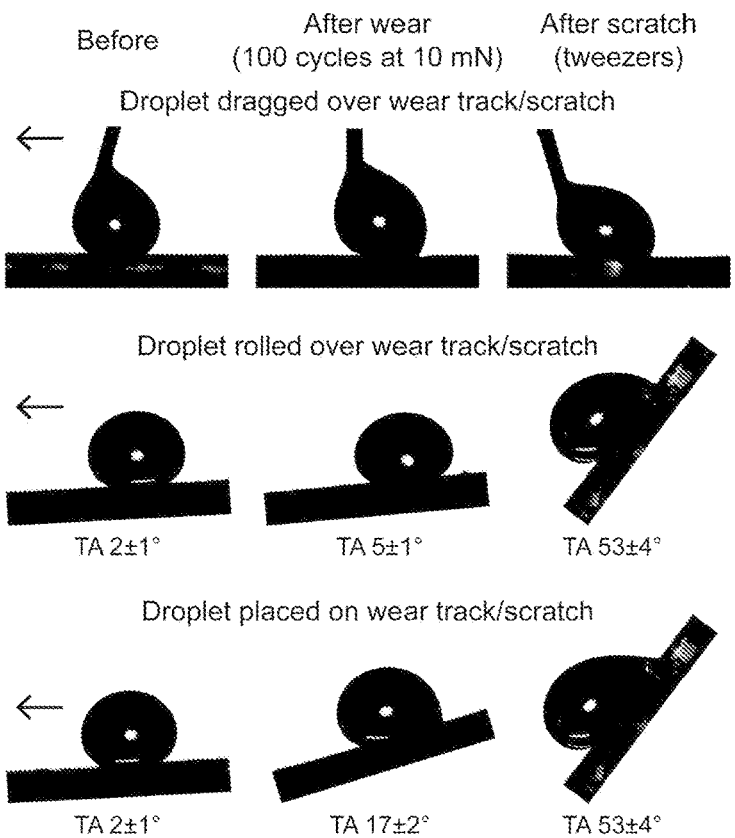
FIG. 7 includes images of hexadecane droplets before and after wear/scratching. Droplets were dragged or tilted across the defect in direction of arrows. Before the wear test, droplets rolled off the surface at 2±1° tilt angle. For the worn samples, droplets placed to the right of the wear track rolled over the defect at 5±1° tilt angle, and droplets placed directly over the defect at 17±2° tilt angle. Droplets on the scratched sample were pinned at the defect until 53±4° tilt angle regardless of droplet starting position.

Hexadecane TA was recorded before and after the wear experiment as well as for a deliberately destroyed coating created through scratching with tweezers. The results for this investigation are shown in FIG. 7. Before the wear test, hexadecane droplets that were dragged across the surface were not obstructed in any way and rolled off the surface at a TA of 2±1°. After the wear test, hexadecane droplets became pinned at the defect when dragged over the surface and had an increased TA. At a TA of 5±1°, the droplets rolled over the defect. At a TA of 17±2°, a droplet placed on the defect was able to roll away. The data suggest that damage to the surface increases pinning of droplets placed at the defect. However, when the droplets are moving, they are still readily repelled. In contrast, on a deliberately destroyed coating (tweezers), a hexadecane droplet became highly pinned and required a TA of 53±4° for the droplet to roll off regardless of droplet starting position. Because the sample after the wear test still repelled hexadecane at a much smaller TA than the destroyed coating (tweezers) sample, it showed that the coating has wear-resistant properties.

Transparency

Many applications of liquid-repellent surfaces require transparency of the coating. When text is placed behind the coatings on glass, the text remains readable as shown in FIG. 8. The edges of each sample are indicated with dash line. Glass is inherently transparent as shown with untreated glass. For the coated samples, a reduction in transparency was observed with similar transparency properties between the nanoparticle/binder sample and the nanoparticle/binder and fluorosilane sample. Because fluorination only adds a small amount of thickness compared to the nanoparticle/binder layer, there is little reduction in transparency for the fluorination step. Transparency can be improved by varying the particle-to-binder ratio in order to decrease coating thickness.

Oil-Water Separation

For oil-water separations, surfaces that are either superhydrophobic/superoleophilic or a superhydrophilic/superoleophobic are needed. Using the method shown in FIG. 1(a), superhydrophobic and superoleophilic coatings can be obtained. By adding a fluorosurfactant to the top of this coating as shown in FIG. 1(b), superhydrophilic and superoleophobic properties can be obtained. In both cases, the inclusion of a nanoparticle layer enhances the surface properties of the functional layer to result in super-philic/superphobic surfaces. Water and hexadecane droplet images and CA are shown in FIG. 3 showing wetting and repellency for both coatings.

Figure 9:
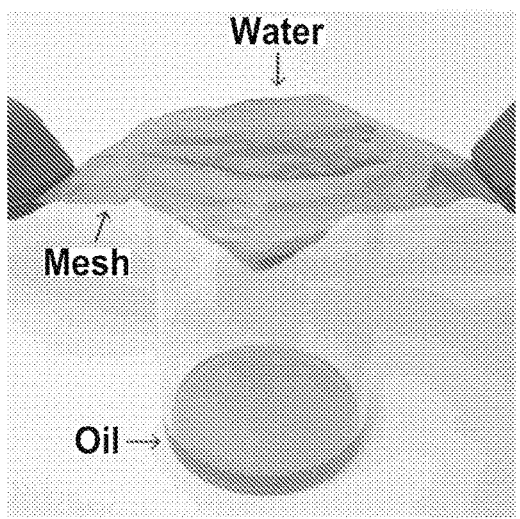
FIG. 9 includes photographs of an oil-water separation performed using the superhydrophobic/superoleophilic nanoparticle/binder coating and the superhydrophilic/superoleophobic nanoparticle/binder and fluorosurfactant coating, both deposited on a stainless steel mesh. When the superhydrophobic/superoleophilic coated mesh is placed horizontally, water collects on top of the mesh whereas oil passes through. In contrast, on the superhydrophilic/superoleophobic coated mesh, water passes through the mesh whereas oil remains on top. When the meshes are placed at an incline, water and oil can be collected simultaneously in separate beakers. Oil and water dyes were used to enhance contrast.
Figure 9:
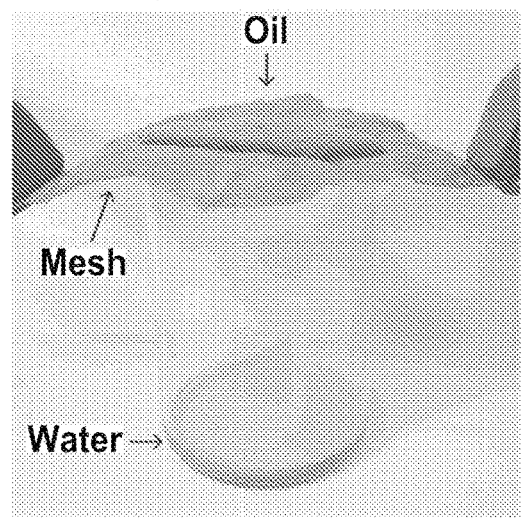
Figure 9:
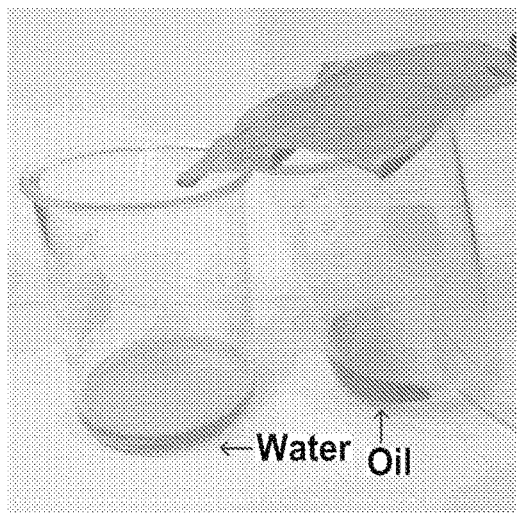
Figure 9:
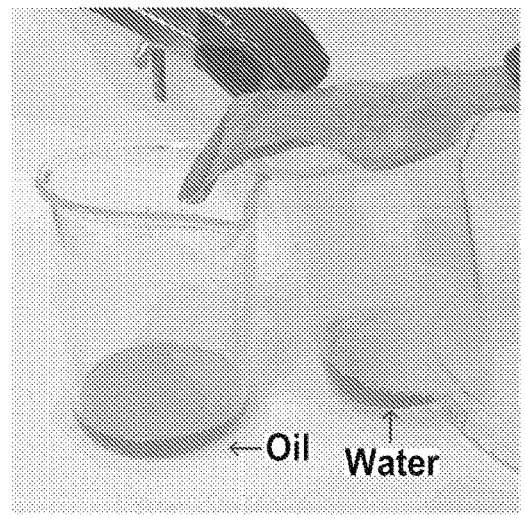

The oil-water separation achieved for both coatings is shown in FIG. 9. Coatings were formed on stainless steel meshes as described above. Agitated oil-water mixtures were poured onto the coated meshes suspended over beakers. When the superhydrophobic/superoleophilic-coated mesh was placed horizontally, the oil component of the mixture passed through whereas the water remained on top. Meanwhile, for the superhydrophilic/superoleophobic-coated mesh, the opposite occurred with the water component passing through the mesh and the oil remaining on top. When the meshes are placed at an incline, water and oil can be collected simultaneously in separate beakers. The oil repellency of the superhydrophilic/superoleophobic coating, in addition to wetting by water, is due to the fluorosurfactant containing a low surface tension fluorinated tail and a high surface tension head group. During deposition, the hydrophilic head group is favorably attracted to the chemically activated surface resulting in the hydrophobic tail pointing away from the surface. Large, bulky oil molecules are trapped at this fluorinated interface while smaller water molecules can more easily penetrate down to the hydrophilic region.

In both cases, the agitated mixture was effectively separated into its constitutive parts. Discrete droplets (of water or oil, depending upon the method used) of various sizes could be repelled, though the smallest droplet that is possible to separate is dependent upon the size of the mesh. These coatings could be applied to different materials like meshes or filters, depending upon the application, which will determine the size of oil droplets or other organic material (for instance algae or other microorganisms) that can be removed from the water. For bulk cleanup like at an oil spill, coarse separators could be used to remove the vast majority of the oil, followed downstream by finer filters to remove smaller contaminants.

In some cases, the use of a superhydrophilic/superoleophobic coating in oil-water separations can be advantageous because surface contamination by oil and other oil-based contaminants is common, and the porous material must then be cleaned or replaced, resulting in a drop in the separation efficiency over time. This can be avoided by using a superhydrophilic/superoleophobic coating, since the water phase is allowed to pass through the mesh and the oil phase is repelled. Additionally, water is denser than oil and tends to sink to the bottom of a mixture. Thus, superhydrophobic/superoleophilic are less compatible in certain applications, such as gravity-driven oil-water separations.

Self-Cleaning, Anti-Smudge, and Antifouling

Figure 10:
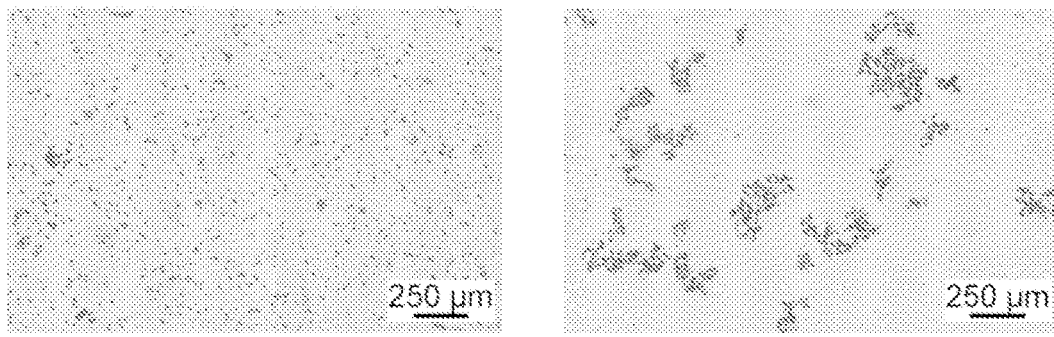
FIG. 10 shows optical micrographs of contaminated coatings before and after self-cleaning test on untreated glass and the nanoparticle/binder coating. Dark spots on coatings indicate silicon carbide particle contaminants. Image analysis suggest a >90% removal of particles on the nanoparticle/binder coating.
Figure 10:
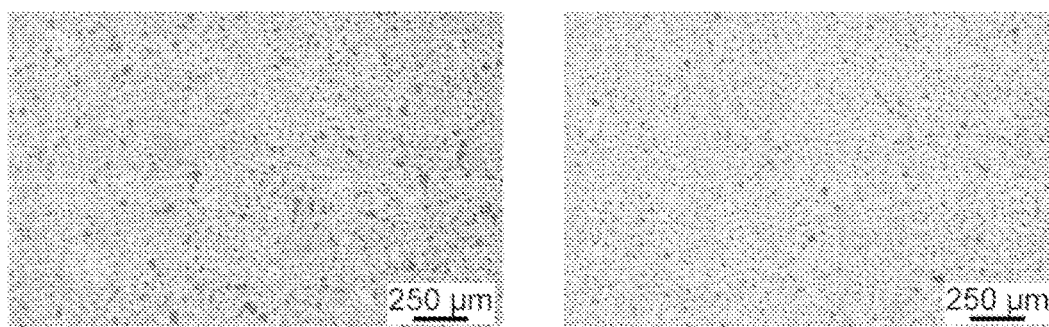
Figure 10:
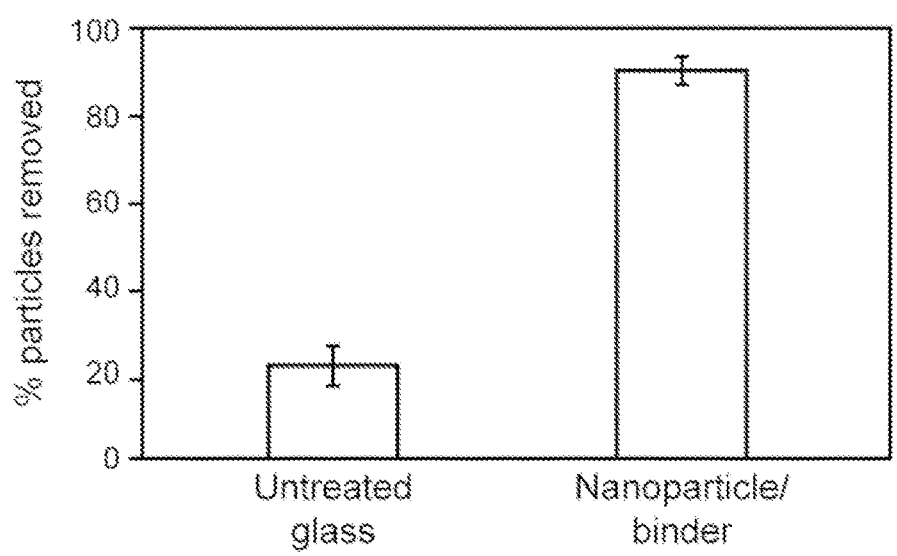

The water- and oil-repellent properties of these surfaces make them suitable for self-cleaning, anti-smudge, and antifouling applications. When contaminated with silicon carbide, it has been demonstrated that the vast majority of the contaminants can be removed by the action of water droplets rolling across the repellent surfaces, collecting the particles in the process as shown in FIG. 10. These superhydrophobic coatings are self-cleaning due to their high water CA and low CAH. Water droplets deposited onto these samples are able to roll over the coating with little impediment, collecting contaminants as they go. The nanoparticle/binder coating showed >90% removal of contaminant particles.

Figure 11:
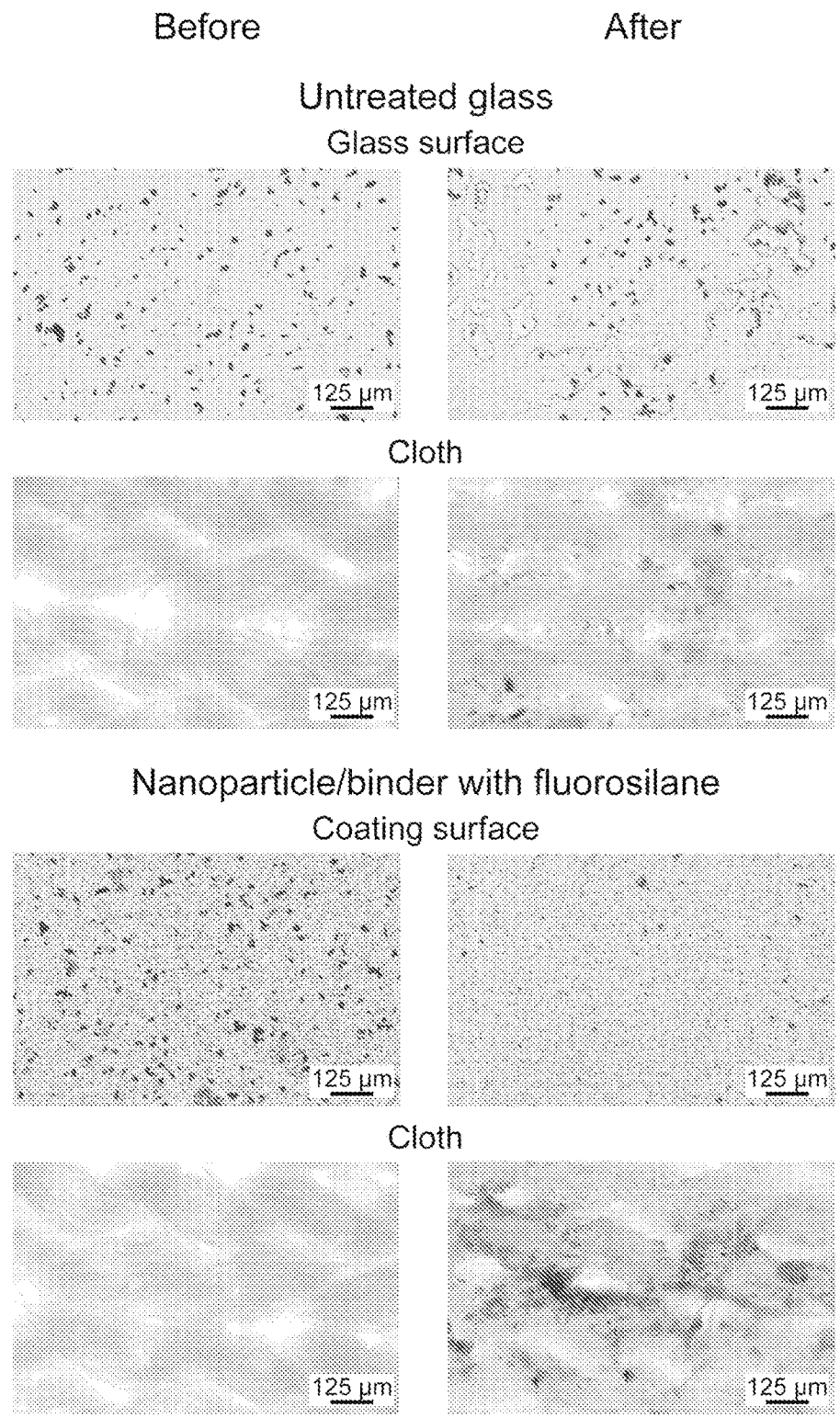
FIG. 11 shows optical micrographs of contaminated surface and oil-impregnated microfiber cloth before and after anti-smudge test on untreated glass and the nanoparticle/binder surfaces. Dark spots on coatings and cloth indicate silicon carbide particle contaminants.

For anti-smudge, the surfaces were contaminated in a similar way and a hexadecane-soaked cloth was used to wipe the contaminated surfaces as shown in FIG. 11. For the oil-repellent surfaces, the particles were transferred to the cloth with few observable particles remaining on the surfaces. Similarly, to the self-cleaning experiments with water, the anti-smudge property relies on a high contact angle and low hysteresis for the oil. The oil in the cloth is able to collect oleophilic contaminants from the surface of the coating without sticking to the surface.

Finally, the oil-repellent coatings could be used for antibiofouling, where superoleophobicity and nanostructuring can contribute to reducing microorganism attachment. The superhydrophilic/superoleophobic method also reduces fouling by attracting a thin water film due to the hydrophilic nature.

Summary

An adaptable coating technique using hydrophobic $SiO_2$ nanoparticles and binder of methylphenyl silicone resin deposited using a spray technique was fabricated for glass, various polymers, and stainless steel mesh. This coating exhibited quasi-spherical re-entrant structures, wear-resistance, and transparency. Additional surface functionality was obtained after ultraviolet-ozone treatment and deposition of either a fluorosurfactant or fluorosilane. The various surface functionalities allow this coating to repel surfactant-containing liquids, separate oil and water, and exhibit self-cleaning, anti-smudge, and antifouling properties. The characteristics of such coating could find applications in plastic packaging, biomedical devices, optical devices, solar panels, and windows where self-cleaning, anti-smudge, antifouling, and low-drag properties are important The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. An article comprising a substrate and a repellent coating disposed on a surface of the substrate,
   wherein the repellant coating comprises hydrophobic particles dispersed within a polymer binder,
   wherein the hydrophobic particles are aggregated to form a multiplicity of re-entrant structures embedded within and protruding from the polymer binder, and
   wherein the polymer binder comprises an uncharged polymer.

2. The article of claim 1, wherein the polymer binder comprises a polysiloxane.

3. The article of claim 1, wherein the polymer binder comprises methylphenyl silicone.

4. The article of claim 1, wherein the hydrophobic particles comprise nanoparticles having an average particle size of from 1 nm to 50 nm.

5. The article of claim 4, wherein the nanoparticles comprise alkaline earth metal oxide nanoparticles, transition metal oxide nanoparticles, lanthanide metal oxide nanoparticles, group IVA oxide nanoparticles, transition metal nanoparticles, transition-metal catalyst nanoparticles, metal alloy nanoparticles, silicate nanoparticles, alumino-silicate nanoparticles, clays, or combinations thereof.

6. The article of claim 1, wherein the hydrophobic particles comprise silicon dioxide nanoparticles.

7. The article of claim 1, wherein the hydrophobic particles and the polymer binder are present in a weight ratio of from 1:1 to 10:1.

8. The article of claim 1, wherein the repellent coating further comprises a functional material disposed on the polymer binder, on the multiplicity of re-entrant structures embedded within and protruding from the polymer binder, or a combination thereof.

9. The article of claim 8, wherein the functional material comprises a superoleophilic material, a superoleophobic material, a superhydrophobic material, a superhydrophilic material, or combinations thereof.

10. The article of claim 8, wherein the functional material is patterned.

11. The article of claim 8, wherein the functional material is covalently attached to the polymer binder, to the multiplicity of re-entrant structures embedded within and protruding from the polymer binder, or a combination thereof.

12. The article of claim 8, wherein the functional material comprises a low surface energy material.

13. The article of claim 8, wherein the functional material comprises a fluorosurfactant.

14. The article of claim 8, wherein the functional material comprises a halogenated silane.

15. The article of claim 8, wherein the functional material comprises a fluoropolymer.

16. The article of claim 8, wherein the functional material has a thickness of 100 nm or less.

17. The article of claim 1, wherein the repellent coating has a thickness of from 100 nm to 800 nm.

18. A method of separating a liquid mixture comprising a polar liquid and a non-polar liquid, the method comprising contacting the article of claim 1 with the liquid mixture under conditions effective to afford permeation of either the polar liquid or the non-polar liquid through the article.

19. A method of forming an article comprising a repellent coating on a substrate, comprising:
   a. preparing coating dispersion comprising hydrophobic particles dispersed within a polymer binder; and
   b. depositing the coating dispersion on a surface of the substrate to form the repellent coating, wherein when deposited the hydrophobic particles aggregate to form a multiplicity of re-entrant structures embedded within and protruding from the polymer binder and wherein the polymer binder comprises an uncharged polymer.

20. An article comprising a substrate and a repellent coating disposed on a surface of the substrate,
   wherein the repellant coating comprises hydrophobic particles dispersed within a polymer binder,
   wherein the hydrophobic particles are aggregated to form a multiplicity of re-entrant structures embedded within and protruding from the polymer binder, and
   wherein the repellent coating further comprises a functional material disposed on the polymer binder, on the multiplicity of re-entrant structures, or a combination thereof, and wherein the functional material comprises a superoleophilic material, a superoleophobic material, a superhydrophobic material, a superhydrophilic material, or combinations thereof.

* * * * *